(12) United States Patent
Vissa et al.

(10) Patent No.: US 10,251,056 B2
(45) Date of Patent: *Apr. 2, 2019

(54) ELECTRONIC DEVICE WITH GESTURE ACTUATION OF COMPANION DEVICES, AND CORRESPONDING SYSTEMS AND METHODS

(71) Applicant: Motorola Mobility LLC, Chicago, IL (US)

(72) Inventors: Sudhir Vissa, Bensenville, IL (US); Vivek Tyagi, Chicago, IL (US); Douglas Lautner, Round Lake, IL (US); David Schuster, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/209,530

(22) Filed: Jul. 13, 2016

(65) Prior Publication Data

US 2018/0020350 A1 Jan. 18, 2018

(51) Int. Cl.
*G06F 1/06* (2006.01)
*H04W 12/06* (2009.01)
(Continued)

(52) U.S. Cl.
CPC ............ *H04W 12/06* (2013.01); *G06F 1/163* (2013.01); *G06F 1/1694* (2013.01);
(Continued)

(58) Field of Classification Search
CPC ..... G06F 1/163; G06F 3/017; G06K 9/00013; G06K 9/00892; H04L 63/0853
See application file for complete search history.

(56) References Cited

U.S. PATENT DOCUMENTS

2002/0138767 A1 9/2002 Hamid
2003/0172283 A1 9/2003 O'Hara
(Continued)

FOREIGN PATENT DOCUMENTS

CN 104850769 8/2015
EP 2793214 10/2014
(Continued)

OTHER PUBLICATIONS

Morris, Euros, "GB Search Report and Written Opinion", GB Application No. GB1710801.0; dated Dec. 20, 2017; Search Date Dec. 18, 2017.

(Continued)

*Primary Examiner* — Harunur Rashid
(74) *Attorney, Agent, or Firm* — Philip H. Burrus, IV

(57) ABSTRACT

An electronic device includes a biometric sensor, such as a fingerprint sensor, to identify biometric input. One or more processors are then operable to identify at least one paired device and at least one companion device operating within a wireless communication radius. The paired device then detects and identifies a simple gesture, communicating this in an electronic communication to a wireless communication circuit of the electronic device. The one or more processors then identify at least one authentication agent operating on the at least one companion device and select at least one authentication credential for the at least one authentication agent. The wireless communication circuit then delivers an authentication credential in response to the predefined gesture input.

20 Claims, 15 Drawing Sheets

(51) Int. Cl.
*G06F 1/16* (2006.01)
*G06F 3/01* (2006.01)
*G06K 9/00* (2006.01)
*H04L 29/06* (2006.01)
*H04M 1/725* (2006.01)
*G06F 21/32* (2013.01)
*G06F 21/35* (2013.01)
*G06F 1/3293* (2019.01)
*H04W 12/00* (2009.01)

(52) U.S. Cl.
CPC ............ *G06F 1/1698* (2013.01); *G06F 3/017* (2013.01); *G06F 21/32* (2013.01); *G06F 21/35* (2013.01); *G06K 9/00013* (2013.01); *G06K 9/00892* (2013.01); *H04L 63/0853* (2013.01); *H04L 63/0861* (2013.01); *H04M 1/7253* (2013.01); *G06F 1/3293* (2013.01); *H04M 2203/6054* (2013.01); *H04W 12/00508* (2019.01)

(56) References Cited

U.S. PATENT DOCUMENTS

| | | | |
|---|---|---|---|
| 2007/0057935 | A1 | 3/2007 | Takagi |
| 2007/0171921 | A1 | 7/2007 | Wookey |
| 2008/0238610 | A1 | 10/2008 | Rosenberg |
| 2009/0240940 | A1 | 9/2009 | Shoemake et al. |
| 2011/0312311 | A1 | 12/2011 | Abifaker et al. |
| 2013/0076663 | A1 | 3/2013 | Sirpal et al. |
| 2014/0028435 | A1 | 1/2014 | Brockway, III |
| 2014/0098095 | A1 | 4/2014 | Lee |
| 2014/0118317 | A1 | 5/2014 | Song et al. |
| 2014/0160337 | A1 | 6/2014 | Van Den Herik |
| 2014/0306985 | A1 | 10/2014 | Jeong |
| 2014/0320274 | A1* | 10/2014 | De Schepper .......... G06F 3/017 340/12.22 |
| 2015/0022515 | A1 | 1/2015 | Ikeda et al. |
| 2015/0042674 | A1 | 2/2015 | Lin |
| 2015/0081559 | A1* | 3/2015 | Dua ....................... G06Q 20/20 705/44 |
| 2015/0146387 | A1 | 5/2015 | Lee |
| 2015/0177789 | A1 | 6/2015 | Jinbo |
| 2015/0186636 | A1 | 7/2015 | Tharappel |
| 2015/0227223 | A1 | 8/2015 | Kang et al. |
| 2015/0286813 | A1* | 10/2015 | Jakobsson ................ G06F 21/35 726/9 |
| 2015/0301672 | A1 | 10/2015 | Kim et al. |
| 2015/0338916 | A1* | 11/2015 | Priyantha ................ G06F 3/017 345/173 |
| 2015/0348453 | A1 | 12/2015 | Jin et al. |
| 2015/0358315 | A1* | 12/2015 | Cronin ................ H04L 63/0861 726/6 |
| 2016/0021168 | A1 | 1/2016 | Chaudhri et al. |
| 2016/0057139 | A1 | 2/2016 | McDonough |
| 2016/0267732 | A1* | 9/2016 | Agrafioti ................. G06F 21/40 |
| 2017/0017313 | A1 | 1/2017 | Rakshit |
| 2017/0177096 | A1 | 6/2017 | Cheong et al. |
| 2017/0185289 | A1 | 6/2017 | Kim |
| 2017/0345365 | A1 | 11/2017 | Li |

FOREIGN PATENT DOCUMENTS

| | | |
|---|---|---|
| WO | 2015/187504 | 12/2015 |
| WO | 2015/195011 | 12/2015 |

OTHER PUBLICATIONS

Saddington, Aaron, "GB Search and Written Opinion", GB Application No. GB1710820.0; dated Dec. 19, 2017.
Tran, Kim Thanh Thi, U.S. Appl. No. 15/209,527, filed Jul. 13, 2016; dated Dec. 12, 2017.
Tran, Kim Thanh Thi, "NonFinal OA", U.S. Appl. No. 15/209,519, filed Jul.13, 2016; dated Oct. 17, 2017.
Zanglein, Ulrike, "PCT Search Report", PCT/US2017/041435; International Filing Date Jul. 11, 2017; dated Sep. 21, 2017.
Hauber, Jorg, "European Search Report", European Application No. EP 17179859; dated Oct. 9, 2017.
Kanaan, Simon, "NonFinal OA", U.S. Appl. No. 15/209,514, filed Jul. 13, 2016; dated Apr. 2, 2018.
Tran, Kim Than Thi, "Final Office Action", U.S. Appl. No. 15/209,519, filed Jul. 13, 2016; dated May 8, 2018.
Gee, Jason Kai Yin, "NonFinal OA", U.S. Appl. No. 15/209,524, filed Jul. 13, 2016; dated Jul. 6, 2018.
Tran, Kim Thanh Thi, "Final OA", U.S. Appl. No. 15/209,527, filed Jul. 13, 2016; dated Jul. 12, 2018.
Gee, Jason, "Final Office Action", U.S. Appl. No. 15/209,534, filed Jul. 13, 2016; dated Dec. 13, 2018.
Kanaan, Simon, "NonFinal Office Action", U.S. Appl. No. 15/209,514, filed Jul. 13, 2016; dated Dec. 13, 2018.
Tran, Kim Thanh Thi, "Final OA", U.S. Appl. No. 15/209,519, filed Jul. 13, 2016; dated Aug. 27, 2018.

\* cited by examiner

ELECTRONIC DEVICE WITH GESTURE ACTUATION OF COMPANION DEVICES, AND CORRESPONDING SYSTEMS AND METHODS

BACKGROUND

Technical Field

This disclosure relates generally to electronic devices, and more particularly to portable electronic devices with motion sensors.

Background Art

Mobile electronic communication devices are used by billions of people. The owners of such devices use them for many different purposes including, but not limited to, voice communications, text messaging, Internet browsing, calendar management, commerce such as banking, and social networking.

As these devices become more sophisticated, they can also become more complicated to operate. Illustrating by example, many "smart devices" now come equipped with touch sensitive displays rather than physical keyboards. While touching a surface is considered by some to be a simpler operation than working a complex keyboard, executing complex operations can require the navigation of several different menu tiers or user interface levels.

It would be advantageous to have simplified systems and methods for executing complex operations in modern electronic devices.

Figure 1:
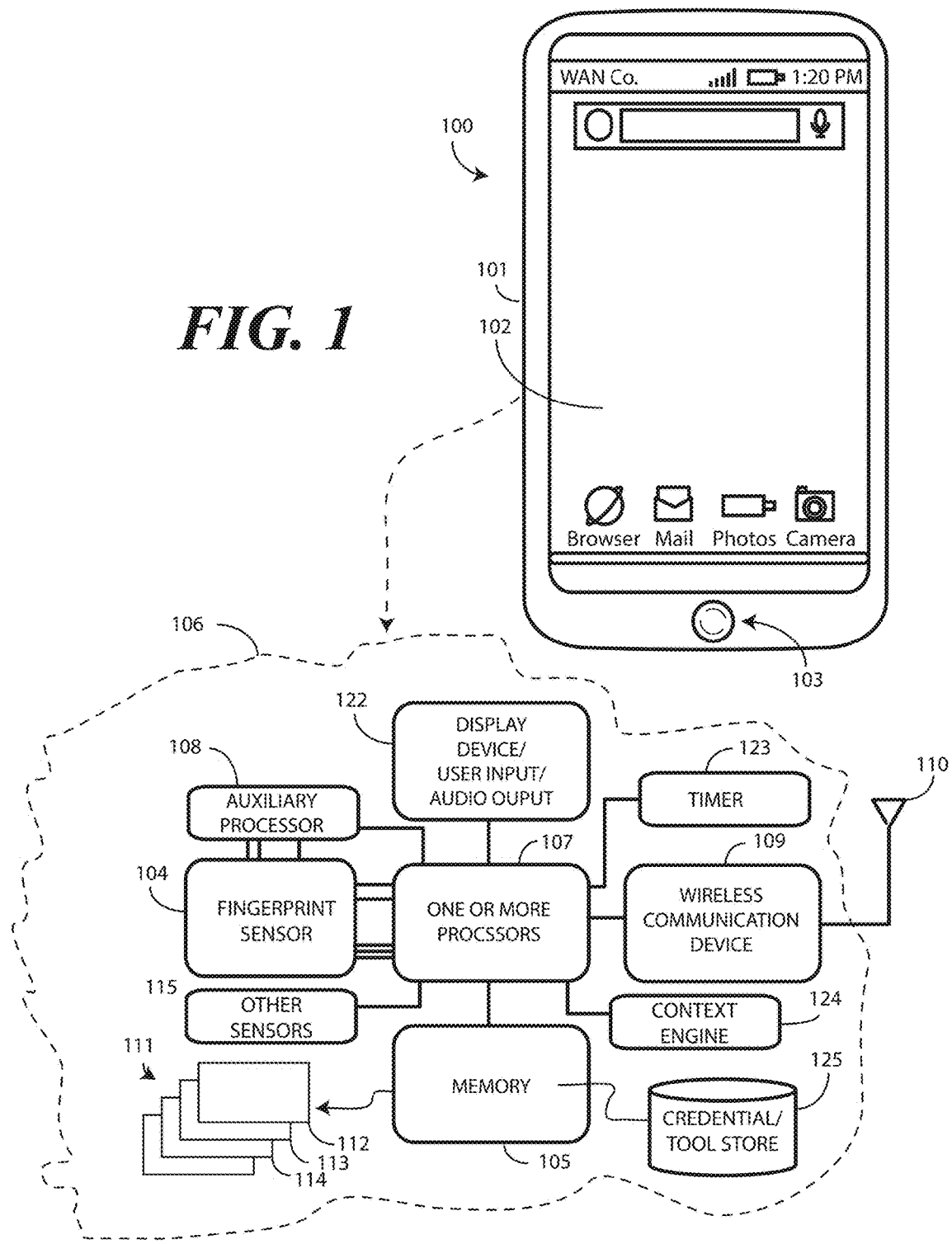
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using biometric sensors in an electronic device that is in communication with a companion device that includes motion or proximity sensors to employ gestures to authenticate a user of an electronic device to a companion device, and in some embodiments to perform operations in companion devices requiring authentication. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods operable on hardware platforms that, when applied to electronic device and/or user interface technology, improve the functioning of the electronic device itself by simplifying companion device operation by way of authentication at the companion device from a biometric sensor of the electronic device, in conjunction with a simple gesture, as detected by a trusted device, to improve the overall user experience by overcoming problems specifically arising in the realm of the recently developed technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of providing user authentication to companion devices in response to biometric authentication received at an electronic device and gestures detected by a trusted device as described herein. The non-processor circuits may include, but are not limited to, a radio receiver, a radio transmitter, signal drivers, clock circuits, power source circuits, and other user input devices. As such, these functions may be interpreted as steps of a method to perform As such, these functions may be interpreted as steps of a method to perform authentication processes to companion devices in response to one or more biometric sensor components receiving biometric input at an electronic device in conjunction with a trusted device detecting a predefined gesture. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide secure and simple methods of delivering authentication credentials to companion devices of an electronic device. Delivery of the authentication credentials can be used for various purposes, including unlocking, actuating, or otherwise controlling companion devices that require authentication as a condition precedent and that are operable with an electronic device. For example, in one embodiment a user delivers a biometric input to a biometric sensor of an electronic device. The user might, for example, place a finger to deliver fingerprint data to a fingerprint sensor of a smartphone. The smartphone would be considered the "electronic device," which may be operable with one or more companion devices.

The electronic device, in one embodiment, is further operable with at least one "trusted device." As used herein, a trusted device is a companion device to which the user has already been authenticated and that is in regular communication with the electronic device. Illustrating by example, one trusted device might be a wearable device such as a smart watch. A user might authenticate themselves to the smart watch through a biometric sensor, entry of a password, or by other techniques. That authentication may remain valid as long as the smart watch is being worn. For example, a biometric sensor may monitor skin contact, the user's pulse, or other biometric input to confirm that the smart watch is being worn. The device may not require the user to authenticate themselves again until the smart watch is removed. While a smart watch is one example of a trusted device, others, including clip-on devices, eyeglasses, pocket devices, exercise monitors, and so forth could equally be trusted devices. Other types of trusted devices will be obvious to those of ordinary skill in the art having the benefit of this disclosure.

Examples of companion devices to which authentication credentials may be delivered in response to biometric input at an electronic device combined with gesture detection in a trusted device can include music players, televisions, media players, lights, thermostats, appliances, locks, and so forth. While electronic device may be in electronic communication with these companion devices, some form of user authentication may be required prior to the companion devices performing a particular function. For example, a user password may be required to unlock a screen saver on a tablet computer operating as a companion device to the smartphone in this illustrative example.

Rather than having to enter the password on the tablet computer directly, embodiments of the disclosure provide secure and simple methods of delivering authentication credentials to the tablet computer—or another companion device—when the companion device is in communication with the electronic device. Illustrating by example, in one embodiment a user can provide authentication to a companion device using a fingerprint sensor on a primary electronic device, followed by making a gesture as detected by a trusted device that is operational with the primary electronic device. By touching the fingerprint sensor, the user can authenticate themselves to the primary electronic device. Upon authentication of identification, a user can make a "key turn" simulation gesture to, for instance, to cause authentication credentials to be delivered to the companion device. The companion device can then use these authentication credentials to perform one or more operations. Advantageously, this eliminates the need for a user to navigate to an application, and through the application, which may require several touches or user interactions with the display, to perform the same operation.

For instance, upon receiving authentication credentials, a companion device configured as a music player may sign-in to a streaming music service using the authentication credentials to start streaming music when the music player is operating within a wireless communication radius of the electronic device. Advantageously, this eliminates the need for a user to physically approach the music player, navigate to an application, and through the application, which may require several touches or user interactions with the display, perform the same operation.

In one or more embodiments, an electronic device includes a biometric sensor, one example of which is a fingerprint sensor. The biometric sensor is responsible for identifying biometric input received at the biometric sensor. One or more processors, which are operable with the biometric sensor, then identify one or more companion devices operating within a wireless communication radius of the electronic device. As noted above, the companion devices can include music players, tablet computers, wirelessly connected home devices and appliances, health trackers, tools, and so forth.

Once the user is identified from the biometric input, in one embodiment one or more gesture sensors of a trusted device, operating in conjunction with the electronic device having the biometric sensor, identify a predefined gesture input. The gesture sensors can include motion detectors, proximity detectors, or combinations thereof. One example of a predefined gesture input would be where the user, wearing a smart watch, makes a twisting motion about a major axis as if twisting a key in a lock. In one embodiment, when this occurs, and the one or more gesture sensors identify the gesture as the predefined gesture input, a wireless communication circuit responsive to the one or more processors delivers a notification of this detection to the electronic device.

Upon receipt of gesture notification, in one embodiment the one or more processors of the electronic device identify an authentication agent operating on at least one companion device. An authentication agent, as used herein, is a hardware or software tool configured to perform one or more functions in response to receiving authentication credentials. Examples of authentication credentials include user names, passwords, personal identification numbers, and so forth.

The authentication agent can be integral to the companion device in one embodiment. For example, where the companion device is a music player, an authentication credential may be required to actuate the music player to ensure that unauthorized personnel do not access the companion device without permission. Alternatively, the companion device may be a proxy for an authentication agent. If, for example, the companion device is a tablet computer, the user may desire to access a web portal operating in a web browser of the tablet computer. Accordingly, the tablet computer would serve as the proxy for the authentication agent of the web portal.

In one embodiment, when this occurs, i.e., when the authentication agent is identified, the one or more processors select an authentication credential for the authentication agent. Embodiments of the disclosure contemplate that different authentication agents may have different protocols for receiving and/or ingesting authentication credentials. Accordingly, the one or more processors may also optionally select an authentication tool that is operable with the authentication agent to ensure proper ingestion and delivery of the authentication credential to the authentication agent.

In one or more embodiments, the one or more processors then cause a wireless communication circuit to deliver the authentication credential to the authentication agent of the electronic device. As noted above, the authentication credential can be used in any of a variety of ways. The authentication credential can cause actuation the companion device, control the companion device, cause delivery of data to or from the companion device, or perform other control operations. Thus, in one embodiment, a user touches a fingerprint sensor of an electronic device, then makes a predefined gesture that is detected by a trusted device, such as making a twisting motion to perform a key turn simulation as if a key were in a lock, and one or more processors of the electronic device deliver an actuation credential to a music streaming authentication agent operating on a companion wireless music player to start enjoying smooth jazz during cocktail hour.

Advantageously, embodiments of the disclosure provide a secure and fast way to lock, unlock, actuate, deactuate, or otherwise control a companion device. Where multiple companion devices are operating within the wireless communication radius, or alternatively when multiple authentication agents are operating on one or more companion devices, embodiments of the disclosure provide methods and systems for selecting between the various authentication agents as well.

Illustrating by example, in one embodiment a list of authentication agents and/or their corresponding companion devices is presented on the display from which a user can select one or more authentication agents to which corresponding authentication credentials should be delivered. In another embodiment, an audible or other notification that there are multiple authentication agents operating on companion devices is delivered, from which a user may deliver an audible command such as "send user name and password to the streaming app on the music player" to select that particular authentication agent. In yet another embodiment, a context engine operating on the electronic device identifies one or more authentication agents based upon contextual cues or operating modes of the electronic device. Other techniques for alerting the user to the fact that there are multiple authentication agents operating within the predefined wireless radius will be obvious to those of ordinary skill in the art having the benefit of this disclosure.

In one or more embodiments, a biometric authentication is used at a first electronic device, in combination with a gesture as detected by a trusted device in communication with the electronic device, to authenticate a user to a companion device without the user needing to provide authentication directly to the companion device. Advantageously, the use of biometric and gesture authentication allows a user to use a biometric sensor of a single device, while making a gesture with a companion device, to retrieve and deliver authentication credentials, and optionally authentication tools, for many different authentication agents.

Additionally, embodiments of the disclosure allow multiple users of a single companion device to use various user accounts with the same companion device. Where, for example, a family shared a music player had had different music streaming accounts, one family member would be able to listen to Tom Waits by causing their authentication credentials to be delivered with simple combined biometric and gesture input, while another member may be able to listen to Dave Brubeck with the same simple touch and gesture using their electronic device.

Illustrating by another example, if a family uses one tablet computer, the one or more processors operating within the tablet computer can identify a particular family member, and log into their social media account, by receiving an authentication credential for the social media account in response to biometric input and gesture detection being received at a remote device. Moreover, the remote biometric authentication with gesture detection also advantageously allows multiple users of a companion device to control differing access levels operating on that particular companion device. For instance, parents may not want their children to listen to heavy metal music. Accordingly, when a child is identified at a common music player, they may be allowed to control the music player, but only to play jazz, bluegrass, or classical music. By contrast, when the biometric sensor identifies a parent, and a corresponding gesture is detected, they may be able to control the music player to listen to bone-crushing metal like there is no tomorrow. Other advantages of embodiments of the disclosure will be obvious to those of ordinary skill in the art having the benefit of this disclosure.

In one or more embodiments, the one or more processors executing the operations corresponding to interaction with the biometric sensor, the trusted device, and the wireless communication circuit is a low-power, auxiliary processor.

As will be described in more detail below, in one or more embodiments an electronic device is equipped with an application processor an auxiliary processor. As used herein, an "application" processor is configured to operate the primary applications of the electronic device, including the operating system environment. A "secondary" or "auxiliary" processor can be configured to operate ancillary or secondary functions. However, in one or more embodiments the auxiliary processor is operable with the biometric sensor, the trusted device, and the wireless communication circuit to deliver authentication credentials to control companion devices operating within a predefined wireless communication radius in response to biometric input at the electronic device.

In one or more embodiments, the auxiliary processor is a low power processor having lower power consumption than the application processor. For example, in one embodiment the application processor is tasked with providing the operating system environment and for performing application operating functions of an electronic device. Accordingly, the application processor will consume relatively large amounts of power. By contrast, the auxiliary processor may perform a limited number of functions including, but not limited to, delivering authentication credentials to companion devices operating within a predefined wireless communication radius in response to biometric input.

Thus, in one or more embodiments the auxiliary processor is configured as a smaller component that consumes less power than an application processor. Biometric sensors, gesture detection message reception and wireless communication circuits in accordance with embodiments of the disclosure can be configured to work with either device. However, in one or more embodiments control of companion devices in response to biometric input and gesture detection is advantageously performed by the auxiliary process to save power and extend operational run time of the electronic device. Embodiments of the disclosure contemplate that power savings—and thus longer runtime on a single battery charge—can be achieved by using the auxiliary processor, rather than the application processor, to deliver authentication credentials to companion device authentication agents.

In one or more embodiments, an electronic device includes a biometric sensor such as a fingerprint sensor responsible for identifying fingerprint data. The electronic device can be in communication with a trusted device. The electronic device can include an application processor and an auxiliary processor, where the auxiliary processor consumes less power than the application processor. In one or more embodiments, the auxiliary processor is configured to receive gesture detection communications from the trusted device. The auxiliary processor can also determine, with a wireless communication circuit, one or more companion devices in communication with the electronic device. The auxiliary processor can further identify one or more authentication agents operating on the companion devices, as well as optionally receive a user selection of the authentication agent. When this occurs, the wireless communication circuit delivers an authentication credential to at least one companion device in response to the one or more motion sensors detecting the predefined gesture.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a palm-top computer, a tablet computer, a gaming device, a media player, or other wireless communication device.

This illustrative electronic device 100 includes a display 102, which in one embodiment is touch-sensitive and defines a primary user interface for the electronic device 100. Users can deliver user input to the display 102 of such an embodiment by delivering touch input from a finger, stylus, or other objects disposed proximately with the display. In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

The explanatory electronic device 100 of FIG. 1 includes a housing 101. Features can be incorporated into the housing 101. In this illustrative embodiment, a biometric sensor 103 disposed along a surface of the housing 101. In one embodiment the biometric sensor 103 is responsible for identifying biometric input received at the biometric sensor 103 to authenticate or otherwise identify a user. Other devices can be disposed along the housing 101 as well. Examples of such devices include an optional camera or speaker port for an audio output device.

In one embodiment, the biometric sensor 103 is a fingerprint sensor 104. However, other types of biometric sensors that can be substituted for the fingerprint sensor 104 will be obvious to those of ordinary skill in the art having the benefit of this disclosure. For example, in other embodiments the biometric sensor 103 can be a voice interface engine. The voice interface engine can include hardware, executable code, and speech monitor executable code in one embodiment. The voice interface engine can include, stored in memory 105, basic speech models, trained speech models, or other modules that are used by the voice interface engine to receive and identify a particular user's voice commands that are received with audio input captured by an audio capture device. In one embodiment, the voice interface engine can include a voice recognition engine.

In another embodiment, the biometric sensor 103 can be an image/gaze detection-processing engine. The image/gaze detection-processing engine can be operable with physical sensors, such as a camera or intelligent imager, to process information detected from a user's gaze to identify the user through facial, eye, or other recognition techniques. The image/gaze detection-processing engine can also be configured to identify the user through facial recognition techniques by capturing photographs of the user. Other examples of biometric sensors 103 suitable for use with embodiments of the disclosure will be obvious to those of ordinary skill in the art having the benefit of this disclosure.

In one embodiment, the fingerprint sensor 104 includes its own processor to perform various functions, including detecting a finger touching the fingerprint sensor 104, capturing and storing fingerprint data from the finger, and optionally identifying or authenticating a user based upon the fingerprint data. In one or more embodiments the processor of the fingerprint sensor 104 can, as one pre-processing step, perform a preliminary authentication of the user by comparing fingerprint data captured by the fingerprint sensor 104 to a reference file stored in memory 105, while secondary authentication is performed by the application processor 107 or auxiliary processor 108. The processor of the fingerprint sensor 104 can be an on-board processor. Alternatively, the processor can be a secondary processor that is external to, but operable with, the fingerprint sensor in another embodiment. One example of which is the auxiliary processor 108. Other configurations will be obvious to those of ordinary skill in the art having the benefit of this disclosure.

In one embodiment, the fingerprint sensor 104 can include a plurality of sensors. The fingerprint sensor 104 can be a complementary metal-oxide-semiconductor active pixel sensor digital imager or any other fingerprint sensor. The fingerprint sensor 104 can be configured to capture, with the plurality of sensors, a live scan of a fingerprint pattern from a finger disposed along its surface, and to store this information as fingerprint data from the user's finger. The fingerprint sensor 104 may also be able to capture one or more images with the plurality of sensors. The images can correspond to an area beneath a surface of skin. The fingerprint sensor 104 can compare the fingerprint data or skin images to one or more references to authenticate a user in an authentication process.

While the biometric sensor 103 is disposed along a front surface of the housing 101 in this illustration, it should be noted that it could alternatively be disposed along the rear surface of the housing 101 in other embodiments. In still other embodiments, the biometric sensor 103 could be disposed beneath the display 102, thereby allowing the user to place a finger on the display 102 for identification.

In one embodiment, where the biometric sensor 103 is a fingerprint sensor 104, the fingerprint sensor 104 can be a single function device. In other embodiments, the fingerprint sensor 104 can be a dual or multifunction device. Illustrating by example, in one embodiment the fingerprint sensor 104 is solely responsible for receiving biometric data from a user and either authenticating the user or determining that the user is unauthorized to use the electronic device 100. This would be a single function fingerprint sensor.

In other embodiments, the fingerprint sensor 104 may be capable of performing multiple functions. Again illustrating by example, in one embodiment the fingerprint sensor 104 can receive biometric data from a user and either authenticate the user or determine that the user is unauthorized to use the electronic device 100. However, the fingerprint sensor 104 may also be configured as a push button. Thus, by touching the fingerprint sensor 104 the user may deliver biometric data only. However, by touching and pressing the fingerprint sensor 104, the fingerprint sensor 104 may both authenticate the user by receiving the biometric data from touch input and perform a second function in response to the push button being depressed.

The fingerprint sensor 104 can be configured to capture, with the plurality of sensors, a live scan of a fingerprint pattern from a finger disposed along its surface, and to store this information as fingerprint data from the user's finger. The fingerprint sensor 104 may also be able to capture one or more images with the plurality of sensors. The images can correspond to an area beneath a surface of skin. The fingerprint sensor 104 can compare the fingerprint data or skin images to one or more references to authenticate a user in an authentication process.

A block diagram schematic 106 of the electronic device 100 is also shown in FIG. 1. In one embodiment, the electronic device 100 includes one or more processors. In one embodiment, the electronic device includes an application processor 107 and an auxiliary processor 108. One or both of the application processor 107 or the auxiliary processor 108 can include one or more processors. One or both of the application processor 107 or the auxiliary processor 108 can be a microprocessor, a group of processing components, one or more Application Specific Integrated Circuits (ASICs), programmable logic, or other type of processing device. The application processor 107 and the auxiliary processor 108 can be operable with the various components of the electronic device 100. Each of the application processor 107 and the auxiliary processor 108 can be configured to process and execute executable software code to perform the various functions of the electronic device 100. A storage device, such as memory 105, can optionally store the executable software code used by the application processor 107 or the auxiliary processor 108 during operation.

As noted above, in one or more embodiments the auxiliary processor 108 is a low power processor having lower power consumption than the application processor 107. For example, in one embodiment the application processor 107 is tasked with providing the operating system environment and for running various applications operating on the electronic device 100. Accordingly, the application processor 107 can consume relatively large amounts of power.

For example, in one embodiment, the application processor 107 is responsible for running the operating system environment 111. The operating system environment 111 can include a kernel 112 and one or more drivers, and an application service layer 113, and an application layer 114. The operating system environment 111 can be configured as executable code stored in memory 105.

The application layer 114 can be responsible for executing application service modules. The application service modules may support one or more applications or "apps." The applications of the application layer 114 can be configured as clients of the application service layer 113 to communicate with services through application program interfaces (APIs), messages, events, or other inter-process communication interfaces.

By contrast, the auxiliary processor 108 may perform a limited number of functions including, but not limited to, controlling companion devices operating within a predefined wireless communication radius in response to biometric input and gesture detection. Thus, in one or more embodiments the auxiliary processor 108 is configured as a smaller component that consumes less power than an application processor 107. Where control of companion devices in response to biometric and gesture input is advantageously performed by the auxiliary processor 108, this saves power and extends operational run time of the electronic device 100. Advantageously, power savings are achieved by using the auxiliary processor 108, rather than the application processor 107, to control companion device operations in one or more embodiments.

In this illustrative embodiment, the electronic device 100 also includes a wireless communication circuit 109 that can be configured for wired or wireless communication with one or more companion devices operating within a predefined wireless communication radius. The wireless communication circuit 109 can also be operable to communicate across one or more networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The wireless communication circuit 109, in one embodiment, may also utilize wireless technology for communication across networks having a limited wireless communication radius. Such networks include, but are not limited to, peer-to-peer or ad hoc communications such as HomeRF, Bluetooth and IEEE 802.11 (a, b, g or n), and other forms of wireless communication such as infrared technology. The wireless communication circuit 109 can include wireless communication circuitry, one of a receiver, a transmitter, or transceiver, and one or more antennas 110.

One or more other sensors 115 can be operable with one or more of the application processor 107, the auxiliary processor 108, or combinations thereof. In one embodiment, the other sensors 115 include motion sensors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion. An altimeter can be included as one of the motion sensors as well. Regardless of the type of motion sensors that are used, they can be operable to detect movement, and direction of movement, of the electronic device 100 by a user, such as when a user pivots, rotates, elevates, translates, or otherwise moves the electronic device 100.

In one or more embodiments, the other sensors 115 also include one or more proximity sensors. The proximity sensors can be used, for example, to compute the distance to any nearby object from characteristics associated with received or reflected signals.

In one embodiment, the auxiliary processor 108 may generate commands or execute control operations based on information received the fingerprint sensor 104 or other biometric sensor 103. The auxiliary processor 108 may also generate commands or execute control operations based upon information received from one or a combination of these sensors. Moreover, the auxiliary processor 108 may process the received sensor information alone or in combination with other data, such as the information stored in the memory 105.

The one or more other sensors 115 may additionally include a microphone, an earpiece speaker, a second loudspeaker, and/or a component of a user interface 122, such as a button. The one or more other sensors 115 may also include key selection sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the housing 101 can be used to determine whether the electronic device 100 is being touched at side edges or major faces of the electronic device 100 are being performed by a user. The touch sensors can include surface and/or housing capacitive sensors in one embodiment. The other sensors 115 can also include audio sensors and video sensors (such as a camera).

A timer 123 can be operable with one or more of the application processor 107 or the auxiliary processor 108. One or both of the application processor 107 or the auxiliary processor 108 can initiate the timer 123 during control operations or method steps. When the timer 123, in one embodiment one or more of the application processor 107 or the auxiliary processor 108 can perform certain control operations when events do, or do not, transpire prior to expiration of the timer 123. Other uses for the timer 123 will be obvious to those of ordinary skill in the art having the benefit of this disclosure.

A context engine 124 can be operable with one or more of the application processor 107 or the auxiliary processor 108. The context engine 124 is operable to infer context from data of the electronic device 100. Illustrating by example, as will be described in more detail below, when one or more of the application processor 107 or the auxiliary processor 108 identifies one or more authentication agents operating one or more companion devices, the context engine 124 may select a particular authentication agent to which an authentication credential should be sent. If, for instance, the electronic device 100 is executing a screen mirroring operation, and a web portal is operational on the display of the companion device, with that web portal being mirrored on the display 102 of the electronic device 100, the context engine 124 may select an authentication credential for this web portal, concluding that the user wishes to access it because it is presently being presented on the display.

In another embodiment, the context engine 124 can be operable with a camera or intelligent imager that is included with the other sensors 115. Where this is the case, the camera or intelligent imager can use data captured in images to infer to which authentication agent an authentication credential should be transmitted. Illustrating by example, the context engine 124 may analyze a photograph of a room to identify a companion device, such as a music player, being operable within a predefined communication radius. If no other companion device is identified, the context engine 124 may select an authentication credential for the music player.

The context engine 124 may analyze other data to infer context, including calendar events, user profiles, device operating states, energy storage within a battery, application data, data from third parties such as web services and social media servers, alarms, time of day, behaviors a user repeats, and other factors to select one or more authentication agents to which authentication credentials should be sent. The context engine 124 can be configured as either hardware components, or alternatively as combinations of hardware components and software components. The context engine 124 can be configured to collect and analyze non-physical parametric data. Other uses for the context engine will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
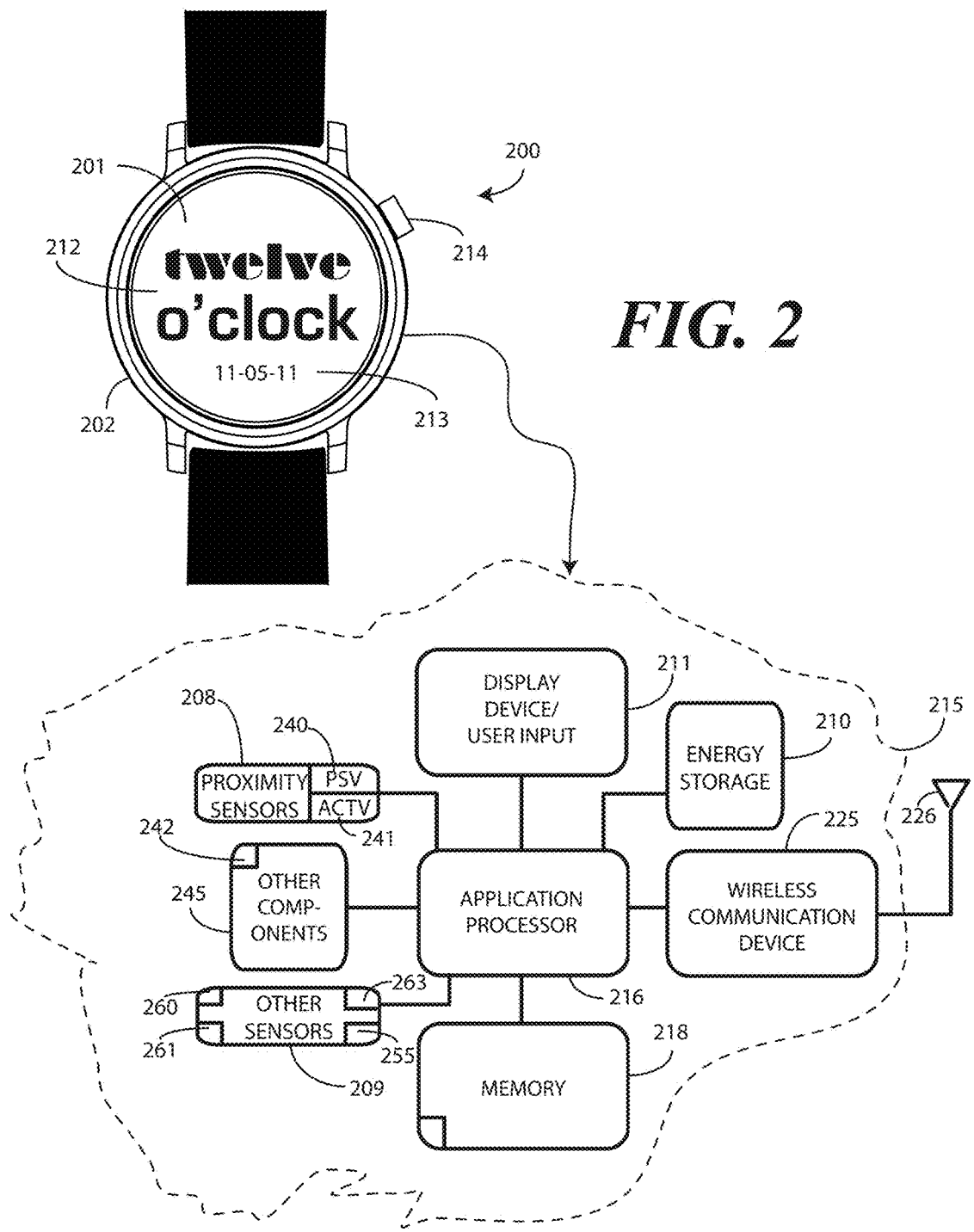
FIG. 2 illustrates one explanatory companion device in accordance with one or more embodiments of the disclosure.

Turning now to FIG. 2, illustrated therein is one embodiment of an electronic device that can be paired with the electronic device (100) of FIG. 1 so as to form a trusted device with the electronic device (100) across a local area, ad hoc, peer-to-peer, or other network. Accordingly, the electronic device of FIG. 2 is referred to as a "paired" device 200 or companion device to electronic device (100) of FIG. 1. The paired device 200 of FIG. 2 is a wearable device, and more particularly is configured as a smart watch. However, the paired device 200 could be any number of devices, wearable or otherwise. A smart watch is simply one example of a paired device 200. Others will be obvious to those of ordinary skill in the art having the benefit of this disclosure.

This illustrative paired device 200 includes a display 202, which may optionally be touch-sensitive. Users can deliver user input to the display 202 of such an embodiment by delivering touch input from a finger, stylus, or other objects disposed proximately with the display. In one embodiment, the display 202 is configured as a light emitting diode (LED) display. However, it should be noted that other types of displays would be obvious to those of ordinary skill in the art having the benefit of this disclosure.

The explanatory paired device 200 of FIG. 2 also includes a watch casing 201. In one or more embodiments, the watch casing 201 is manufactured from a rigid material such as a rigid thermoplastic material, aluminum, steel, or another metal. Still other constructs will be obvious to those of ordinary skill in the art having the benefit of this disclosure.

The watch casing 201 can be formed from a single housing member or from multiple housing members. For example, the watch casing can include a front housing member disposed about the periphery of the display 202 and a rear-housing member defining the backside of the paired device 200. In other embodiments, the watch casing 201 can simply be disposed about perimeter of a smart watch module that is inserted into watch casing 201. Features can be incorporated into the watch casing 201. Examples of such features include an optional speaker port, microphone port, or electrical connector to which a charger may be coupled. Alternatively, a user interface component, such as control crown 214, can be disposed along the watch casing 201.

A block diagram schematic 215 of the paired device 200 is also shown in FIG. 2. In one embodiment, the paired device 200 includes one or more processors 216. The one or more processors 216 can be a microprocessor, a group of processing components, one or more ASICs, programmable logic, or other type of processing device.

In this illustrative embodiment, the paired device 200 also includes a wireless communication circuit 225 that can be configured for wired or wireless communication with one or more other devices or networks. The networks can include a wide area network, a local area network, and/or personal area network. In one or more embodiments, the wireless communication circuit 225 utilizes wireless technology for communication in peer-to-peer or ad hoc communications such as HomeRF, Bluetooth and IEEE 802.11 (a, b, g or n), and other forms of wireless communication such as infrared technology. The wireless communication circuit 225 can include wireless communication circuitry, one of a receiver, a transmitter, or transceiver, and one or more antennas 226.

In one embodiment, the one or more processors 216 can be responsible for performing the primary functions of the paired device 200. For example, in one embodiment the one or more processors 216 comprise one or more circuits operable with one or more user interface devices 211, which can include the display 202, to present presentation information, such as the time of day 212 or date 213, to a user.

In one embodiment, one or more proximity sensors 208 can be operable with the one or more processors 216. In one embodiment, the one or more proximity sensors 208 include one or more proximity sensor components 240. The proximity sensors 208 can also include one or more proximity detector components 241. In one embodiment, the proximity sensor components 240 comprise only signal receivers. By contrast, the proximity detector components 241 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 240 comprises an infrared signal receiver so as to be able to detect infrared emissions from a person. Accordingly, the proximity sensor component 240 requires no transmitter since objects disposed external to the housing deliver emissions that are received by the infrared receiver. As no transmitter is required, each proximity sensor component 240 can operate at a very low power level. Evaluations conducted show that a group of infrared signal receivers can operate with a total current drain of just a few microamps (~10 microamps per sensor). By contrast, a proximity detector component 241, which includes a signal transmitter, may draw hundreds of microamps to a few milliamps.

In one embodiment, one or more proximity detector components 241 can each include a signal receiver and a corresponding signal transmitter. The signal transmitter can transmit a beam of infrared light that reflects from a nearby object and is received by a corresponding signal receiver. The proximity detector components 241 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the paired device 200.

One or more other sensors 209 included in the paired device 200 may include a microphone 260, a speaker 261, and alternatively an imager 263. The one or more other sensors 209 may also include key selection sensors, a touch pad sensor, a touch screen sensor, a capacitive touch sensor, and one or more switches. Touch sensors 255 may used to indicate whether any of the user actuation targets present on the display 202 are being actuated. Alternatively, touch sensors 255 disposed in the watch casing 201 can be used to determine whether the paired device 200 is being touched at side edges or major faces of the paired device 200 are being performed by a user. The touch sensors 255 can include surface and/or housing capacitive sensors in one embodiment.

The other components 245 of the paired device 200 can also include motion detectors 242. For example, an accelerometer may be embedded in the electronic circuitry of the paired device 200 to show vertical orientation, constant tilt and/or whether the paired device 200 is stationary. The measurement of tilt relative to gravity is referred to as "static acceleration," while the measurement of motion and/or vibration is referred to as "dynamic acceleration." A gyroscope can be used in a similar fashion.

Regardless of the type of motion detectors 242 that are used, in one embodiment the motion detectors 242 are also operable to detect movement, and direction of movement, of the paired device 200 by a user. In one or more embodiments, the other sensors 209 and the motion detectors 242 can each be used to detect motion corresponding to a user's body or to human motion. This information can be used to determine that the paired device 200 is being worn on a user's wrist, for example, as well as to detect gesture movement.

Illustrating by example, in one embodiment when the paired device 200 is being worn on a wrist, the motion detectors 242 can be used to detect predefined motions corresponding to human motion. These predefined motions can be small, and can include vibration, shaking, breathing, micromotions, and so forth. For instance, if the user is walking, the motion detectors 242 can detect this movement by detecting motion of the user's wrist. The one or more processors 216 can then extract parametric data from electronic signals delivered by these motion detectors 242 in response to the user walking. By comparing the parametric data to a reference file stored in memory 218, the one or more processors 216 can identify the walking motion as corresponding to the motion of the user's body. The one or more processors 216 can use this information to distinguish the paired device 200 being actively worn on a wrist, for example, as opposed to being placed along a flat surface such as a nightstand or dresser top. The motion detectors 242 can be used to detect other movement of the paired device 200 as well. For example, in some embodiments a user can deliver gesture input by moving a hand or arm in predefined motions when the paired device 200 is being worn on a wrist.

Many of the sensors in the paired device 200 can be used to detect movement, gestures, or other user input. For example, the one or more proximity sensors 208 can detect the gesture of a user waving a hand above the display 202. In another embodiment, the user can deliver gesture input by touching the display 202. In yet another embodiment, the accelerometer 252 can detect gesture input from a user lifting, shaking, or otherwise deliberately moving the paired device 200. In yet other embodiments, the user can deliver gesture input by rotating or changing the orientation of the paired device 200, which can be detected by multiple accelerometers or a gyroscope. It should be clear to those of ordinary skill in the art having the benefit of this disclosure that additional sensors can be included with the other sensors 209 shown in FIG. 2.

Other components 245 operable with the one or more processors 216 can include output components such as video outputs, audio outputs, and/or mechanical outputs. Examples of output components include audio outputs, or other alarms and/or buzzers and/or a mechanical output component such as vibrating or motion-based mechanisms. Still other components will be obvious to those of ordinary skill in the art having the benefit of this disclosure.

An energy storage device 210, such as a rechargeable battery, super capacitor, or fuel cell, can be included in the paired device 200 to power its various components. Where a rechargeable battery is used as the energy storage device 210, this battery can include a lithium ion cell or a nickel metal hydride cell. In one embodiment, the battery is a lithium polymer cell, as such cells having reasonably large energy density, wide operating temperature range, offer large number of charging cycles, and provide long useful life. The energy storage device 210 may also include overvoltage and overcurrent protection and charging circuitry. In one embodiment, the energy storage device 210 is a 350-mAh-lithium polymer cell.

It is to be understood that FIG. 2 is provided for illustrative purposes only and for illustrating components of one paired device 200 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
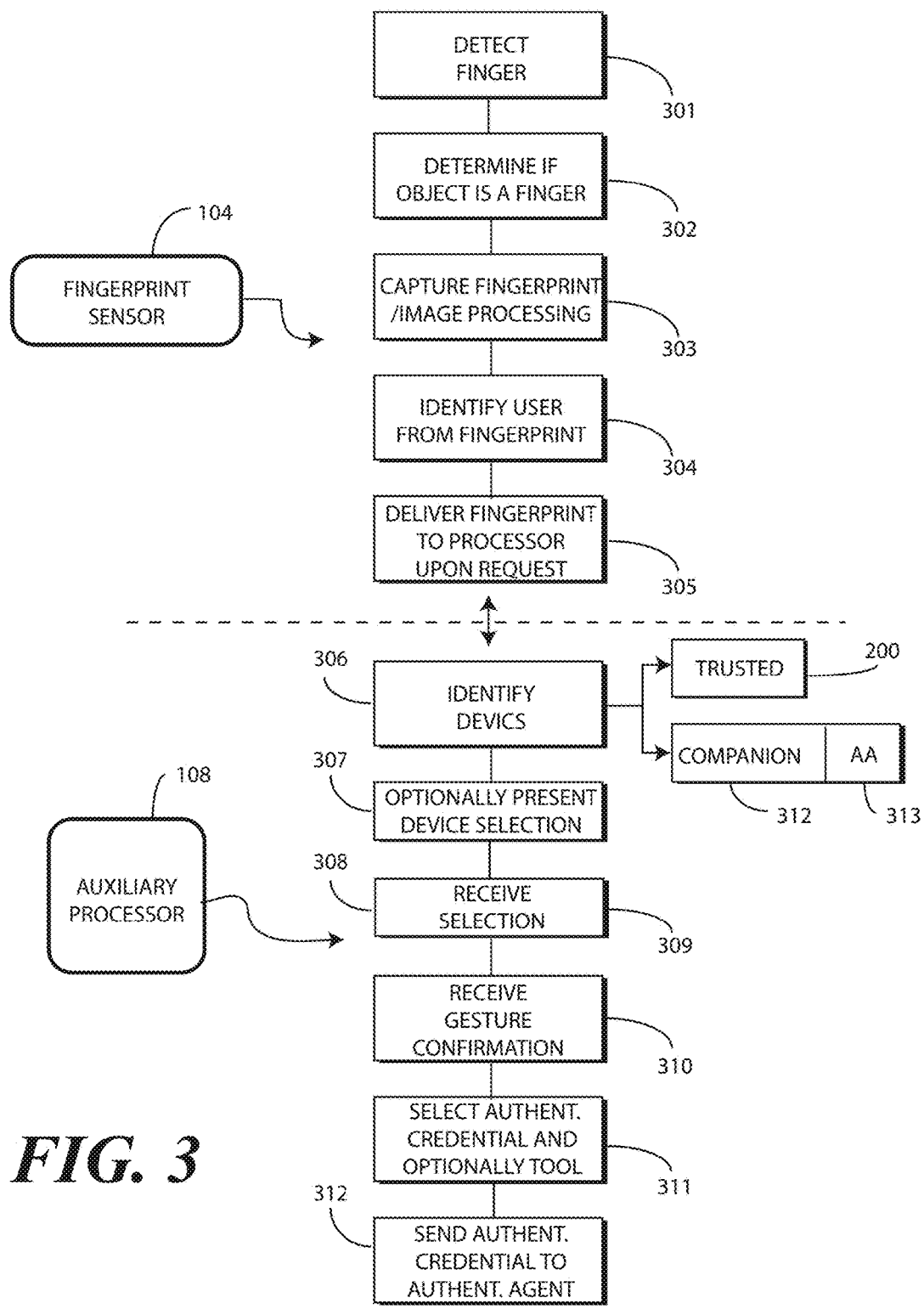
FIG. 3 illustrates one explanatory schematic block diagram of an illustrative electronic device, operating with a companion device, with corresponding functional operations in accordance with one or more embodiments of the disclosure.

Turning now to FIG. 3, illustrated therein are some of the interactions that can occur between the fingerprint sensor 104 and the auxiliary processor 108 in accordance with one or more embodiments of the disclosure. It should be noted that where no auxiliary processor 108 is included, the auxiliary processor functions shown in FIG. 3 can be performed by the application processor (107) of the electronic device (100) instead. Similarly, where an auxiliary processor 108 is included, but is tasked with performing other operations, the application processor (107) of the electronic device (100) can optionally perform one or more of the auxiliary processor functions shown in FIG. 3 as well.

In one embodiment, the fingerprint sensor 104 is to detect 301 a finger proximately located with the fingerprint sensor 104. As a part of the detection process, the fingerprint sensor 104 can enter an input reception mode upon an object contacting the surface of the fingerprint sensor 104.

In one embodiment, the fingerprint sensor 104 can optionally be configured to determine 302 that the object touching or otherwise proximately located with the fingerprint sensor 104 is actually a finger and not an object incapable of authentication. Where the object is a finger, the fingerprint sensor 104 can then capture 303 fingerprint data from the finger and perform other pre-processing such as noise filtering and so forth.

In one or more embodiments, the fingerprint sensor 104 is further to authenticate or identify 304 a user from the fingerprint data received at 303. This step can optionally be performed by the auxiliary processor 108 as well. For example, in one embodiment, one of the fingerprint sensor 104 or the auxiliary processor 108 can perform a matching function. The fingerprint sensor 104 or the auxiliary processor 108, after having received the fingerprint data, can then perform a matching process to determine whether the fingerprint data substantially matches reference data stored in memory. In one embodiment, upon receiving a request from the auxiliary processor 108 for the fingerprint data, the fingerprint sensor 104 can deliver 305 the fingerprint data to the auxiliary processor 108.

The auxiliary processor 108, meanwhile, can work with the wireless communication circuit (109) to be responsible for identifying 306 one or more devices operating within a wireless communication radius of the electronic device (100). In one embodiment, the auxiliary processor 108 will identify 306 at least two types of devices. The first is a paired device 200, which is a trusted device to which the user has authenticated himself and that is in a paired communication with the electronic device (100) across a local area, ad hoc, or peer-to-peer network. In one embodiment, the paired device 200 is a wearable device such as the smart watch shown in FIG. 2. Accordingly, in one or more embodiments, the auxiliary processor 108 will identify 306 at least one paired device 200 operating within a wireless communication radius of the electronic device (100).

The second type of device is a companion device 312. Thus, the auxiliary processor 108 may additionally identify 306 one or more companion devices 312 operating within a wireless communication radius of the electronic device (100). "Companion devices" refer to devices that are in communication with, or alternatively are paired with using a local area network protocol such as Bluetooth.sup.™, with the electronic device (100). Where paired, companion devices 312 would take a lower priority that the paired device 200. Accordingly, in one or more embodiments, the auxiliary processor 108 will identify 306 at least one companion device 312 operating within a wireless communication radius of the electronic device (100).

In some situations, the auxiliary processor 108 will additionally identify 306 at least one authentication agent 313 operating on at least one companion device 312 operating within the wireless communication radius defined by the particular protocol with which the wireless communication circuit (109) is communicating. Where more than one authentication agent 313 or companion device 312 is identified, the auxiliary processor 108 can optionally provide 307 an identification of the multiple companion devices 312 with a user interface (122) of the electronic device (100).

Illustrating by example, in one embodiment the auxiliary processor 108 can present a list of the multiple companion devices along the display (102). In another embodiment, the auxiliary processor 108 can deliver identification of the multiple companion devices 311 audibly through a loudspeaker. In other embodiments described below with reference to FIGS. 11-12, a context engine (124) can select a particular authentication agent 313 operating on a companion device 312. Still other techniques for providing 307 an identification of the multiple companion devices will be obvious to those of ordinary skill in the art having the benefit of this disclosure.

Upon identifying at least one authentication agent operating on at least one companion device operating within the wireless communication radius, where not selected by the context engine (124) or other techniques, in one embodiment the auxiliary processor 108 can receive 308 a user selection of a particular authentication agent 313 or agents operating on a corresponding particular companion device or devices. As with the identification of the various authentication agents, the auxiliary processor 108 can receive 308 the selection in various ways.

In one embodiment, where the auxiliary processor 108 presents a list of the multiple authentication agents operating on one or more companion devices along the display (102), a selection can be received 308 when a user touches a user actuation target corresponding to a particular authentication agent or agents. In another embodiment, where the auxiliary processor 108 delivers the identification of the multiple authentication agents audibly through a loudspeaker, the auxiliary processor 108 may receive 308 the selection of a particular authentication agent or agents as voice input through a microphone included with the other sensors (115). Other techniques for receiving 308 a selection of one or more authentication agents from an identification of multiple authentication agents will be obvious to those of ordinary skill in the art having the benefit of this disclosure.

In one embodiment, after receiving 308 the selection of the authentication agent, the auxiliary processor 108 will receive, with a wireless communication circuit (109) an electronic communication from the paired device 200 that identifies a gesture input. Recall from above that in one or more embodiments, the paired device 200 includes one or more proximity sensors (208), one or more motion detectors (242), and other sensors. These detectors and sensors can be used to identify various gestures as described above. In one or more embodiments, when the paired device 200 detects and identifies a predefined gesture, the one or more processors (216) can cause the wireless communication circuit (225) of the paired device 200 to transmit a message to the electronic device (100) indicating that a predefined gesture has occurred as a user input. Accordingly, in one or more embodiments the auxiliary processor 108 can receive 309, with a wireless communication circuit (109) an electronic communication identifying a predefined gesture input.

When this occurs, the auxiliary processor 108 can select 310 an authentication credential for each selected authentication agent. In one or more embodiments, the auxiliary processor selects 310 the authentication credential as a function of the gesture, as the gesture can select 308 the authentication agent to which the authentication credential should be sent. One such embodiment will be described in more detail below with reference to FIGS. 8 and 9. In other embodiments, the selection 310 of the authentication agent will occur before the electronic communication identifying the predefined gesture is received 309. Accordingly, the auxiliary processor 108 will select 310 the authentication credential in such embodiments in response to, but not as a function of, the predefined gesture.

In one embodiment, the auxiliary processor 108 selects 310 the authentication credential from an authentication credential store (125) storing a plurality of authentication credentials. The auxiliary processor can optionally select 310 at least one actuation tool operable with the at least one authentication agent for ingestion of the at least one authentication credential. The authentication tool may work to execute operations, such as selecting a particular window or portal for various authentication credential components, such as entering a user name in a first window, toggling to a second window to enter a password, and then executing an operation to cause the authentication agent to ingest the password, such as executing an "enter key depress" operation or toggling a user interaction target.

The auxiliary processor 108 can then cause the wireless communication circuit (109) to deliver 311 at least one authentication credential to at least one authentication agent operating on at least one companion device. Where selected and/or necessary, in one embodiment the auxiliary processor 108 can further cause the wireless communication circuit (109) to deliver 311 the at least one actuation tool with the at least one authentication credential. In one embodiment, the auxiliary processor 108 can further cause the wireless communication circuit (109) to deliver 311 the at least one actuation tool with the at least one authentication credential in response to the gesture input identified in the electronic communication. This process will be explained in more detail below with reference to the remaining figures.

Figure 4:
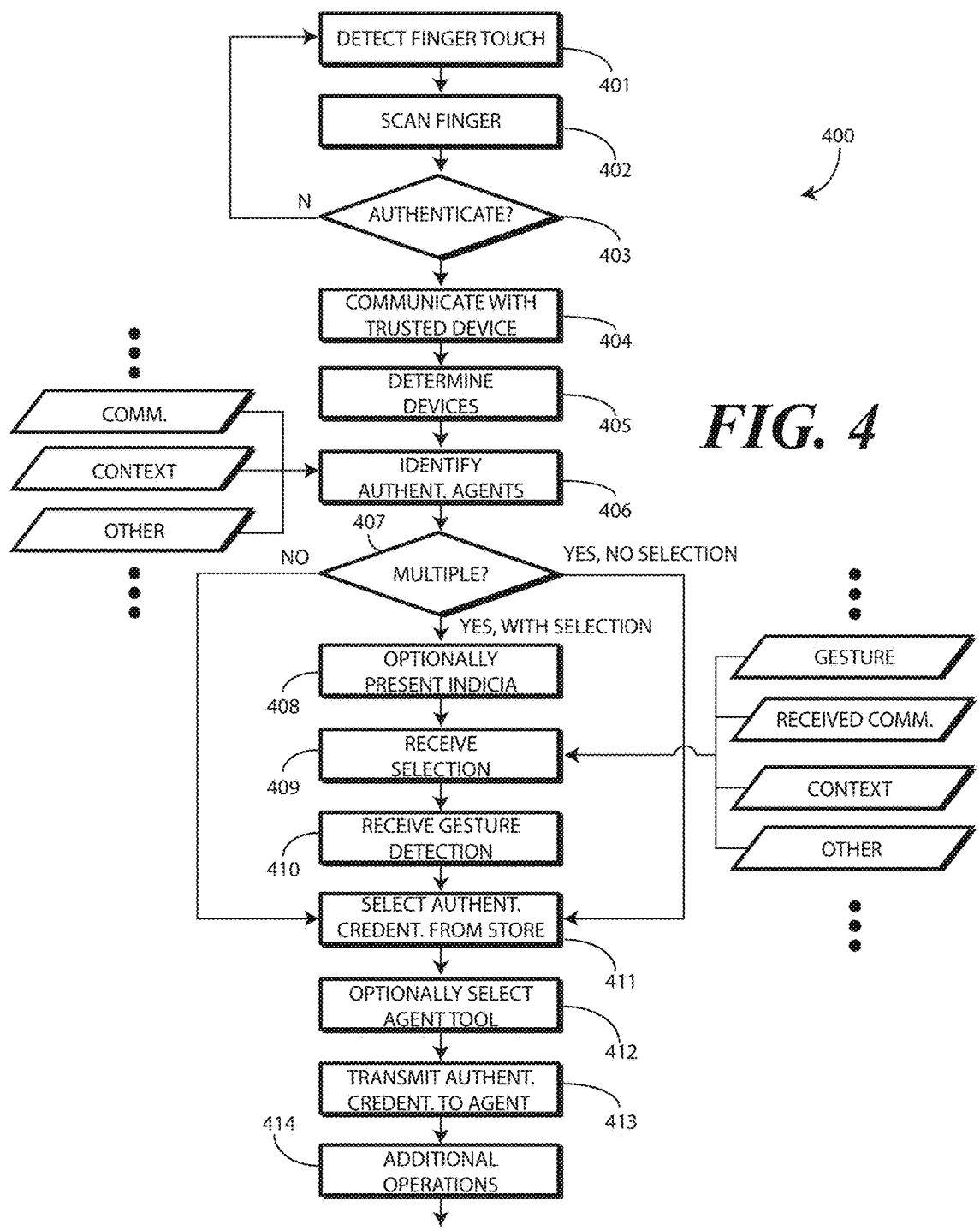
FIG. 4 illustrates one explanatory method in accordance with one or more embodiments of the disclosure.

Now that the various hardware components have been described, attention will be turned to methods and use cases in accordance with one or more embodiments of the disclosure. Turning now to FIG. 4, illustrated therein is one explanatory method 400 for controlling one or more companion devices in accordance with one or more embodiments of the disclosure.

At step 401 a biometric sensor of a first electronic device identifies biometric input. For example, in one embodiment step 401 includes a fingerprint sensor detecting an object touching the fingerprint sensor. In one embodiment, step 402 includes the fingerprint sensor scanning the finger to receive fingerprint data from the finger.

At decision 403, the method 400 can perform an authentication process to identify the fingerprint data received from the finger as described above. Illustrating by example, in one embodiment the fingerprint sensor, after detecting a finger touching the fingerprint sensor and capturing and storing fingerprint data from the finger, can compare the fingerprint data captured by the fingerprint sensor to a reference file stored in memory to determine whether the fingerprint data can be identified. This in turn determines whether the user can be authenticated. Both determinations occur at decision 403. Said differently, in one embodiment, decision 403 includes the biometric sensor determining whether biometric input can identify a user to authenticate the user. Where a user is identified from the fingerprint data, the method proceeds to step 404. Otherwise, the method returns to step 401.

Assuming the user is authenticated at decision 403, in one embodiment the method 400 moves to step 404 the method identifies a trusted, paired device operating within a wireless communication radius of the electronic device. In one or more embodiments, a paired device is a trusted device that is bonded with the electronic device via wireless communication across a local, ad hoc, or peer-to-peer network. A device becomes a paired device by sharing addresses, names, profiles, or other information with the electronic device. Additionally, in one or more embodiments, the paired device shares a secret key with the electronic device to identify itself as a paired device. Paired devices establish this connection via an authentication process where a user validates a paired connection between the devices. Pairing can require user authentication in the form of an identification code or other authentication technique.

In one or more embodiments, the paired device identified at step 404 will be a wearable deice equipped with a wear detection mechanism that identifies whether the user is wearing the wearable device. Wear detection is advantageous because, in one or more embodiments, it keeps a record of wear sessions such that once authenticated, the user will not have to re-authenticate or re-pair the wearable to the electronic device until it is removed from the user. In one or more embodiments, the wearable, paired device can revoke authenticated sessions dynamically either manually or using techniques like received signal strength indication, round trip time delay, or other distance vector determinations by which the wear detection mechanism determines whether the wearable device is being worn.

At step 405, the method 400 determines one or more companion devices operating within a wireless communication radius of an electronic device. Where a number of companion devices are operating within a wireless communication radius, this can be determined as well at step 405. This determination occurring at step 405 can be accomplished in a variety of ways. In one embodiment, a wireless communication circuit of the electronic device initiates an introduction or handshaking process via electronic communication to determine whether companion devices are operating within a wireless communication radius. In another embodiment, the wireless communication circuit will search for one or more networks operating within the wireless communication radius. Upon detecting networks, the wireless communication circuit can query those networks to identify companion devices. In other embodiments, the companion devices will be "trusted" or "paired" devices that are in peer-to-peer or ad hoc networks with the electronic device. Other techniques for identifying companion devices will be obvious to those of ordinary skill in the art having the benefit of this disclosure.

At step 406, the method 400 identifies at least one authentication agent operating on at least one companion device. As with the detection of companion devices, this can be accomplished in various ways. In one embodiment, a user selection identifies a particular authentication agent operating on a second, companion device. If, for example, a user's smartphone is paired with a computer, and the user wishes to stream video to the computer, the user may select, using the display of the smartphone, an authentication agent for the computer, for the streaming video service, or both.

In another embodiment, a wireless communication circuit may identify authentication agents by exchanging electronic communications with the companion devices. The wireless communication circuit may query each companion device to determine which authentication agents are operating on, or are available on, those companion devices. In another embodiment, a context engine can identify authentication agents. If, for example, a first device a smart device has a web browser operating thereon, the context engine may conclude that the user wishes to send authentication credentials to the currently presented website. Accordingly, the context engine may identify one or more authentication agents by identifying operational authentication agents operating on the local device or a companion device. Other techniques for identifying authentication agents will be obvious to those of ordinary skill in the art having the benefit of this disclosure.

If no companion devices, or alternatively no authentication agents, are identified at steps 405,406, the method 400 can optionally notify the user through a user interface that no companion devices have been detected. However, where at least one companion device and/or at least one authentication agent has been detected, decision 407 determines whether one authentication agent or multiple authentication agents have been detected. Where one, the method proceeds to step 411.

Where there are multiple authentication agents detected, in one embodiment the method 400 optionally notifies the user of this fact at step 408. Methods for providing this notification have been described above with reference to FIG. 3. Illustrating by example, an electronic device may present a list of the multiple authentication agents along its display. A selection can then be received when a user touches a user actuation target corresponding to a particular device. Alternatively, the electronic device may present the list of multiple authentication agents as audible output from a loudspeaker. A selection may be received as voice input through a microphone. Still other techniques for providing an identification of the multiple authentication agents will be obvious to those of ordinary skill in the art having the benefit of this disclosure.

In one embodiment, the method 400 simply selects all available authentication agents. Accordingly, in one embodiment where multiple authentication agents are identified, the method simply moves from decision 407 to step 411.

However, in other embodiments, a selection of a subset of authentication agents occurs. At step 409, the method 400 selects one or more authentication agents from the multiple authentication agents. As with detection of the authentication agents, this can occur in a variety of ways. In one embodiment, the user simply makes a selection, using the user interface of the electronic device for example, of those authentication agents to which it wishes authentication credentials be sent. The user may also deliver the selection by voice command where the electronic device is equipped to process such commands. In yet another embodiment, electronic communication can be used to select particular authentication agents. Where, for example, companion devices operate windows, each containing an authentication agent, an identification of the currently active, highest priority, top tier, or otherwise most relevant authentication can be delivered through electronic communications. In still other embodiments, the context engine can determine a contextual operating condition of the electronic device, such as a mode of operation, a currently operating application, or a user defined operating environment. Where this occurs, the selection at step 409 can be a function of the contextual operating condition determined by the context engine.

As noted above, in one or more embodiments authentication agents are transmitted in response to received wireless communications identifying predefined gestures. In one or more embodiments, these predefined gestures can identify a particular companion device and/or authentication agent. Accordingly, in one or more embodiments, the selection at step 409 is a function of the predefined gesture identified in the wireless communication that is received from the paired device.

Thus, in one embodiment the identifying of authentication agents occurring at step 406 comprises identifying a plurality of authentication agents. The identifying, or selecting, which of those authentication agents should receive authentication credentials at step 409 can comprise receiving a selection of the at least one authentication agent from a user interface. In another embodiment, the selecting at step 409 can also occur from wireless communication, which may identify a predefined gesture that identifies the selection. The selecting at step 409 can also be in response to a context engine detecting a contextual operating condition of an electronic device. Still other mechanisms and techniques for selecting one or more authentication agents will be obvious to those of ordinary skill in the art having the benefit of this disclosure. Regardless of the technique, the selection occurring at step 409 can select one authentication agent or multiple authentication agents.

At step 410, the method 400 receives an electronic communication from a paired device identified at step 404 that identifies a predefined gesture. Illustrating by example, where the paired device is a wearable device, such as the one shown above with reference to FIG. 2, one or more motion, proximity, or other sensors can be used as gesture sensors detect one or more gestures. In one embodiment, the gestures comprise motion of the paired device itself, as detected by one or more motion sensors. In other embodiments, the gestures comprise motion of an object near the paired device, as detected by one or more proximity sensors. For example, in the latter case the one or more proximity sensors may detect a user waving a hand or making another gesture above the paired device instead of by moving the paired device itself.

In one or more embodiments, one or more processors of the paired device attempt to identify the gesture as a predefined gesture. In one embodiment, this can be accomplished by comparing extracted parametric data from the detected gesture motion and comparing it with a profile stored in memory. Where the gesture is identified or authenticated, the method 400 can continue. However, where the gesture is not authenticated or identified, the method 400 can move to step 414, where the processors of the electronic device take other actions such as informing the person that no predefined gesture has been detected.

At step 411, the method 400 selects at least one authentication credential for at least one authentication agent. The authentication credential can be selected from a local memory store in one embodiment. In other embodiments, the authentication credential can be retrieved across the network. For example, in one embodiment various authentication credentials can be stored "in the cloud" on a remote server. Accordingly, in one or more embodiments step 411 includes retrieving the authentication credential across a network, such as the Internet, to enable authentication credential retrieval from the cloud.

Where only one authentication agent is identified at step 406, step 411 selects one authentication credential. Where multiple authentication agents are identified at step 406, and no selection was made, i.e., when the method 400 proceeds directly from decision 407 to step 411, the method selects an authentication credential for each authentication agent.

In another embodiment, where multiple authentication agents are identified at step 406 and a selection is made, i.e., when the method 400 proceeds directly from decision 407 through step 409 to step 410, the method 400 selects an authentication credential for each selected authentication agent. Thus, in one embodiment where the identifying at step 406 comprises identifying a plurality of authentication agents, the selecting at step 409 comprises selecting a plurality of authentication credentials corresponding to the plurality of authentication agents, which can be all authentication agents or only a subset of selected authentication agents.

At step 412, the method 400 also optionally selects an authentication tool. In one embodiment the authentication tool provides a device and/or service specific authentication actuator and interface for the authentication agent. Illustrating by example, for online accounts a browser plugin frequently serves as the authentication agent. Its role is to capture the online account details and to send authentication credentials to a remote server. Upon receiving the authentication credentials, a corresponding authentication tool can perform auto fill and login actions to ensure that the authentication credentials are properly ingested into the authentication agent. By contrast, on a computer, the authentication agent may integrate with the operating system. Accordingly, its authentication credential ingest process would be different. To accommodate this difference, in one embodiment the method 400 would select a different authentication tool at step 412 for the computer than for the browser plugin. The inclusion of different authentication tools advantageously allows a user to provide a "single action" authentication by touching a biometric sensor on a mobile device while delivering authentication credentials to a wide variety of devices, operating systems, software applications, and plugins.

At step 413, the method 400 delivers the authentication credential to at least one authentication agent operating on at least one companion device. In one embodiment, step 413 comprises delivering multiple authentication credentials to multiple authentication agents. Step 413 can optionally include delivering an actuation tool as well.

The authentication credential can take a number of different forms. In its most basic form, the authentication credential can comprise information used to authenticate a user to a particular authentication agent. This can be a user name, password, personal identification number, or other identification credentials. In one embodiment, the authentication credential is encrypted. The authentication tool can optionally decrypt the authentication credential at the authentication agent for ingestion. In other embodiments, the authentication credential can comprise keys or tokens that provide a security or authentication notification. For example, the authentication credential may indicate both an action that the companion device should preform and an indication that a particular user has been identified. Other types of authentication credentials will be obvious to those of ordinary art having the benefit of this disclosure.

Actions taken after receiving the authentication credential can vary depending upon what a particular authentication agent is operable with. For example, after receiving authentication credentials an authentication agent can deliver an electronic message commanding or authorizing a companion device to take a particular action. Examples of such actions include turning ON, turning OFF, selecting content to play, fast forwarding, rewinding, skipping, and so forth. The actions will vary based upon the application and the type of companion device.

Other operations can occur at step 414. For example, in one embodiment step 414 comprises notifying the user that an authentication credential has been successfully delivered. A companion device or authentication agent may send an acknowledgement message in response to receiving the authentication credential. In one or more embodiments, the method $00 may optionally notify the user transmission of the authentication credential was successful at step 414.

Figure 5:
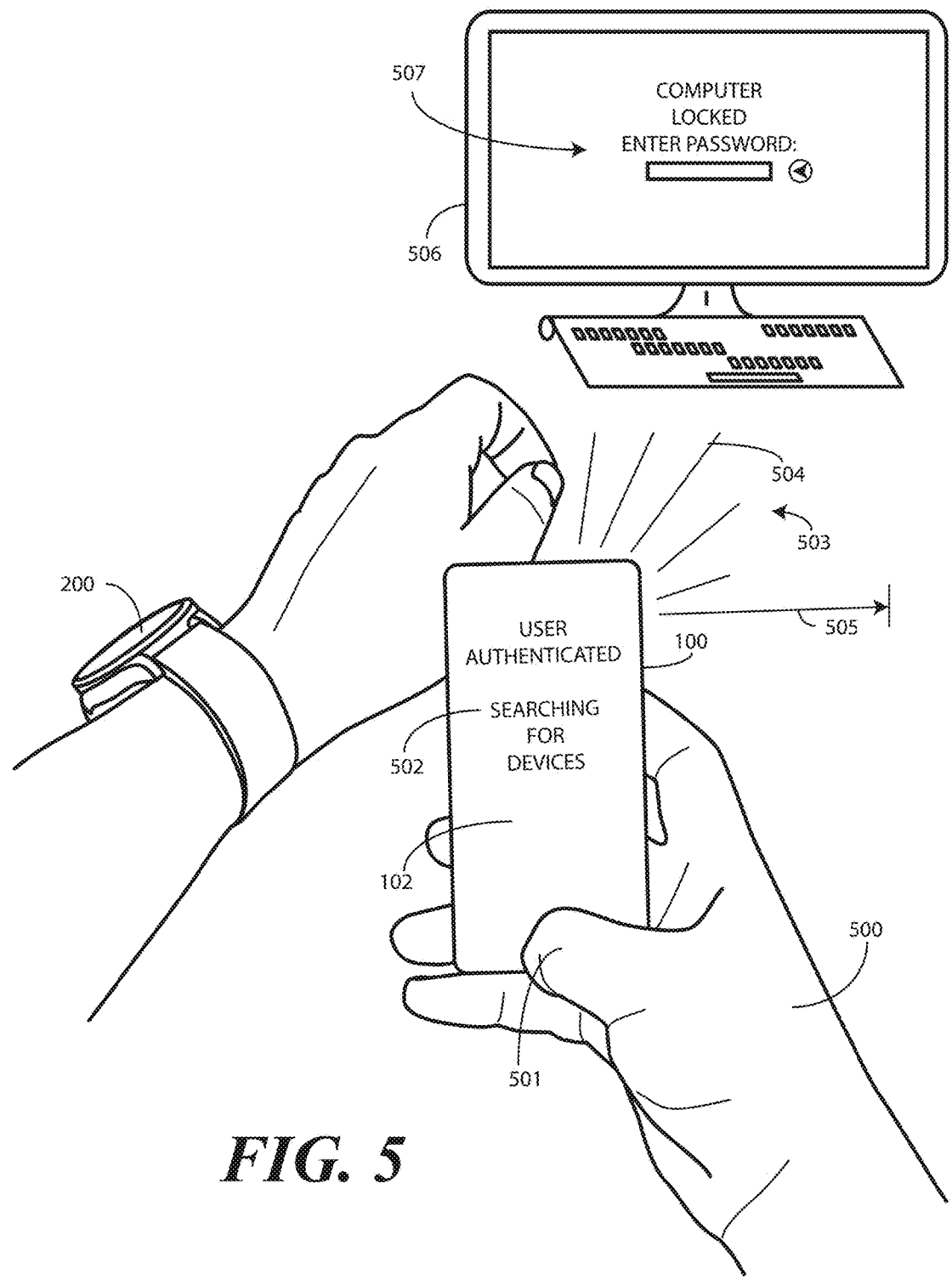
FIG. 5 illustrates one or more method steps for an explanatory system in accordance with one or more embodiments of the disclosure.

To further illustrate the unique features of embodiments of the disclosure, the various method steps of FIGS. 3 and 4, and hardware components of FIGS. 1 and 2, will now be described with the electronic device in use. Turning now to FIG. 5, a user 500 places their finger 501 on a fingerprint sensor (104) of an electronic device 100. When this occurs, the fingerprint sensor (104) identifies fingerprint data from the user's finger 501 to authenticate the user.

As noted above, in one or more embodiments the electronic device 100 includes both an application processor (107) and an auxiliary processor (108). In one embodiment, the auxiliary processor then determines 503, through the exchange of wireless communication signals 504 from a wireless communication circuit (109) in this illustrative embodiment, whether one or more companion devices are in communication with the electronic device 100 within a wireless communication radius 505. The electronic device 100 then identifies at least one authentication agent operating on at least one companion device.

In this illustrative embodiment, the user 500 is also wearing a paired device 200 configured as a smart watch. The paired device 200 is in communication with, and is a trusted device of, the electronic device 100. As noted above, in one or more embodiments the paired device includes one or more proximity sensors (208), one or more motion detectors (242), and other sensors. These detectors and sensors can be used to identify various gestures, either by motion of, or motion about, the paired device 200. In one or more embodiments, when the paired device 200 detects and identifies a predefined gesture, the one or more processors (216) or the paired device 200 can cause the wireless communication circuit (225) of the paired device 200 to transmit a message to the electronic device (100) indicating that a predefined gesture has occurred as a user input.

In this example, a computer 506 is a companion device of the electronic device 100, operating within the wireless communication radius 505. The computer 506 includes an authentication agent 507 that requires authentication credentials in the form of a password for access. Accordingly, using the wireless communication signals 504, the electronic device 100 is able to authenticate each of the paired device 200, the companion device, i.e., the computer 506, and the authentication agent 507 operating on the companion device. In one or more embodiments, a notification 502 can be presented on the display 102 to let the user 500 know what is occurring.

Figure 6:
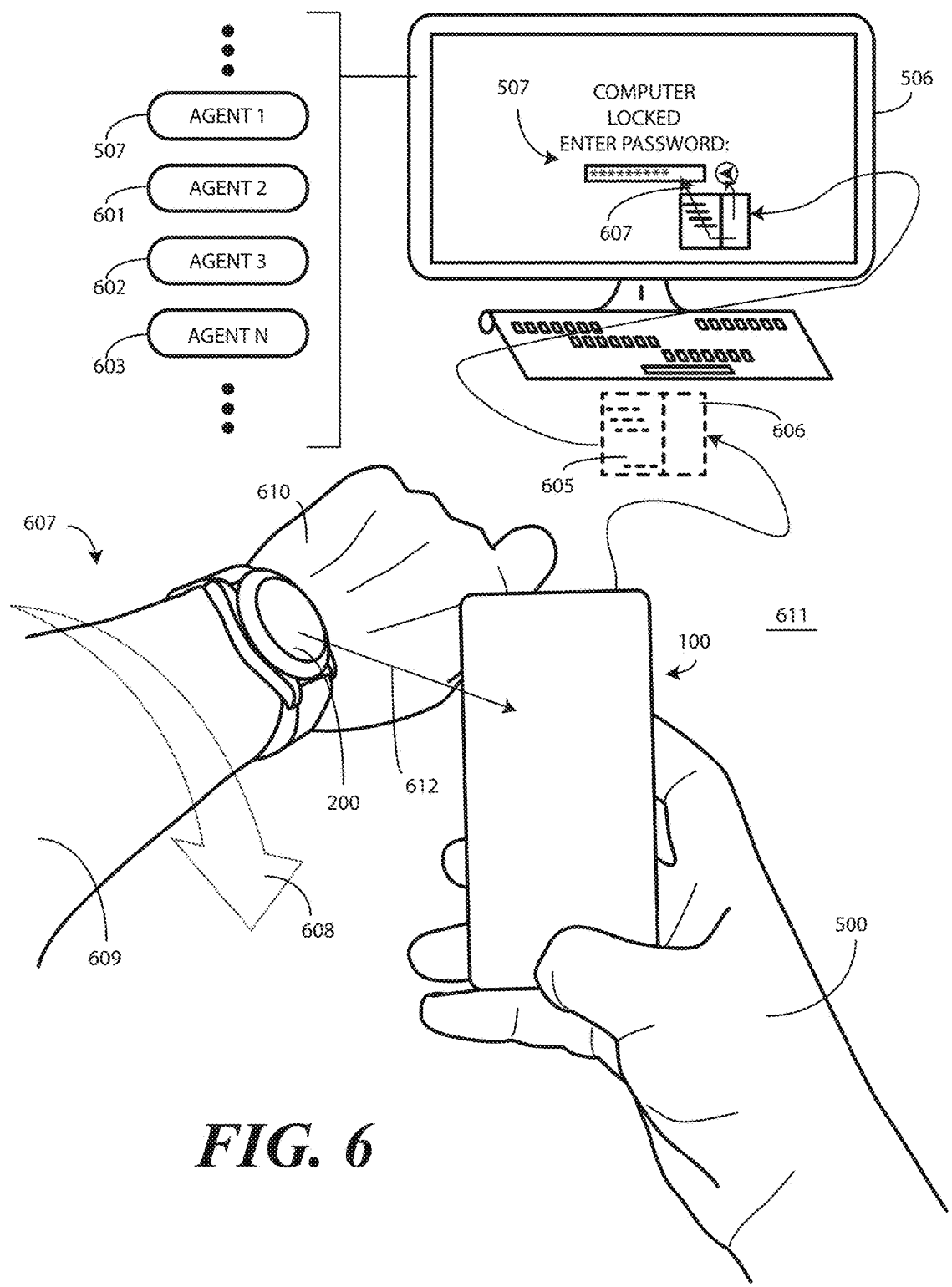
FIG. 6 illustrates one or more method steps for an explanatory system in accordance with one or more embodiments of the disclosure.

Turning to FIG. 6, the electronic device 100 has identified a plurality of authentication agents 507,601,602,603 operating within the wireless communication radius (505). For example, the first authentication agent 507 is the authentication agent for the computer 506 or its operating system. A second authentication agent 601 may be for an applet operating in a web browser. A third authentication agent 602 may be operable with a streaming music service. A fourth authentication agent 603 may be operable with a social media site, and so forth.

In this illustration, since the user 500 must access the computer 506 prior to being able to access any of authentication agents 601,602,603, the electronic device 100 receives, with its wireless communication circuit (109), an electronic communication 604 comprising a selection of the highest tier authentication agent, i.e., authentication agent 507 from the computer 506.

When this occurs, either the auxiliary processor (108) or application processor (107) can then select an authentication credential 605 for the authentication agent 507. In this embodiment, the auxiliary processor (108) or application processor (107) additionally selects an actuation tool 606 operable with the authentication agent 507 for ingestion 607 of the authentication credential 605 into the authentication agent 507.

In this illustrative embodiment, the user 500 provides user input to cause the authentication credential 605 to be delivered to the authentication agent 507. In one embodiment, the user input occurs in the form of a predefined gesture 617. Specifically, the user 500 twists 608 his arm 609 to rotate his hand 610 from the position shown in FIG. 5. This twisting 608, in one embodiment, executes a key turn simulation by rotating the paired device 200 about a major axis defined by the user's arm 609. This simulates the turning of a key once it is in a lock.

This key turn simulation further translates the paired device 200 in free space 611 from a first position, shown in FIG. 5, to a second position, shown in FIG. 6. This predefined gesture 617 is detected by the gesture sensors of the paired device 200. The auxiliary processor (108) of the electronic device 100 can detect this by receiving an electronic communication 612 comprising an identification of the predefined gesture 617.

Upon receiving the electronic communication 612 identifying the predefined gesture 617, the wireless communication circuit (109) of the electronic device 100 then delivers the authentication credential 605 to the authentication agent 507 of the companion device. Here, the wireless communication circuit (109) also transmits the actuation tool 606 with the authentication credential 605. The actuation tool 606 then loads the authentication credential 605 into the authentication agent 507, and presses a user actuation target to cause the authentication agent 507 to ingest 07 the authentication credential 605.

Figure 7:
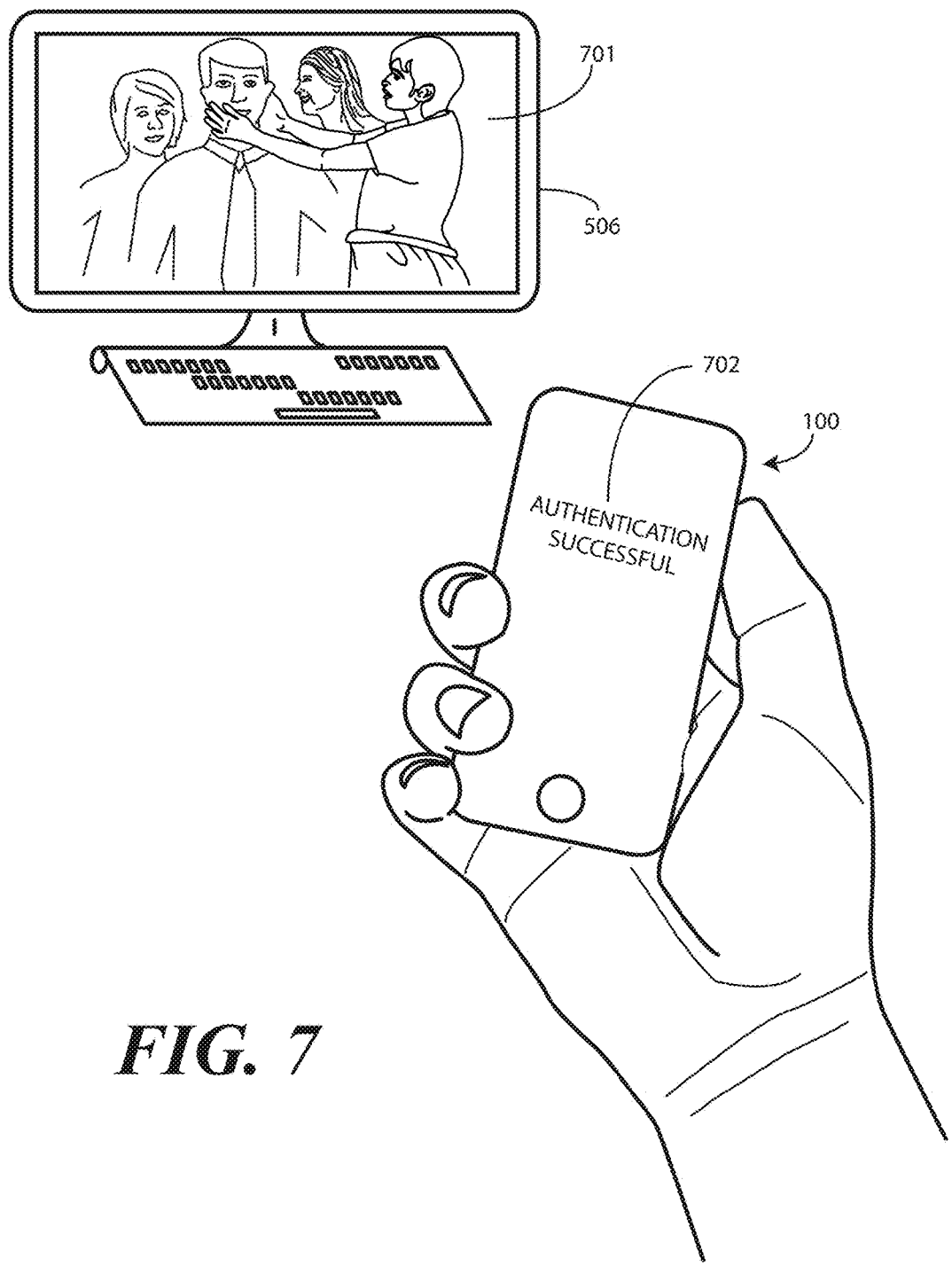
FIG. 7 illustrates one or more method steps for an explanatory system in accordance with one or more embodiments of the disclosure.

As shown in FIG. 7, in this illustrative embodiment the authentication credential (605) unlocks the computer 506. A wallpaper image 701 of the user's family appears on the display of the computer 506. In this illustrative example, the auxiliary processor (108) or the application processor (107) additionally provides a notification 702 with the user interface of the electronic device 100 that the authentication credential (605) was successfully delivered by the wireless communication circuit (109).

Thus, as shown in FIGS. 6-7, embodiments of the disclosure allow the electronic device 100, and its fingerprint sensor (104), to create a seamless way to authenticate devices and services. By using the fingerprint sensor (104) for authentication, the user 500 need not worry about entering different passwords and user names on every different user interface associated with each authentication agent. To the contrary, the electronic device 100 serves as a single point of authentication credential storage that is protected by the fingerprint sensor (104). Only one copy of any authentication credential need be stored in the electronic device 100. The electronic device 100 thus acts as a physical key that protects the various authentication credentials stored therein. The user 500 causes delivery of the authentication credential 605 by executing a simple predefined gesture 617 after the fingerprint sensor (104) authenticates the user 500.

Figure 8:
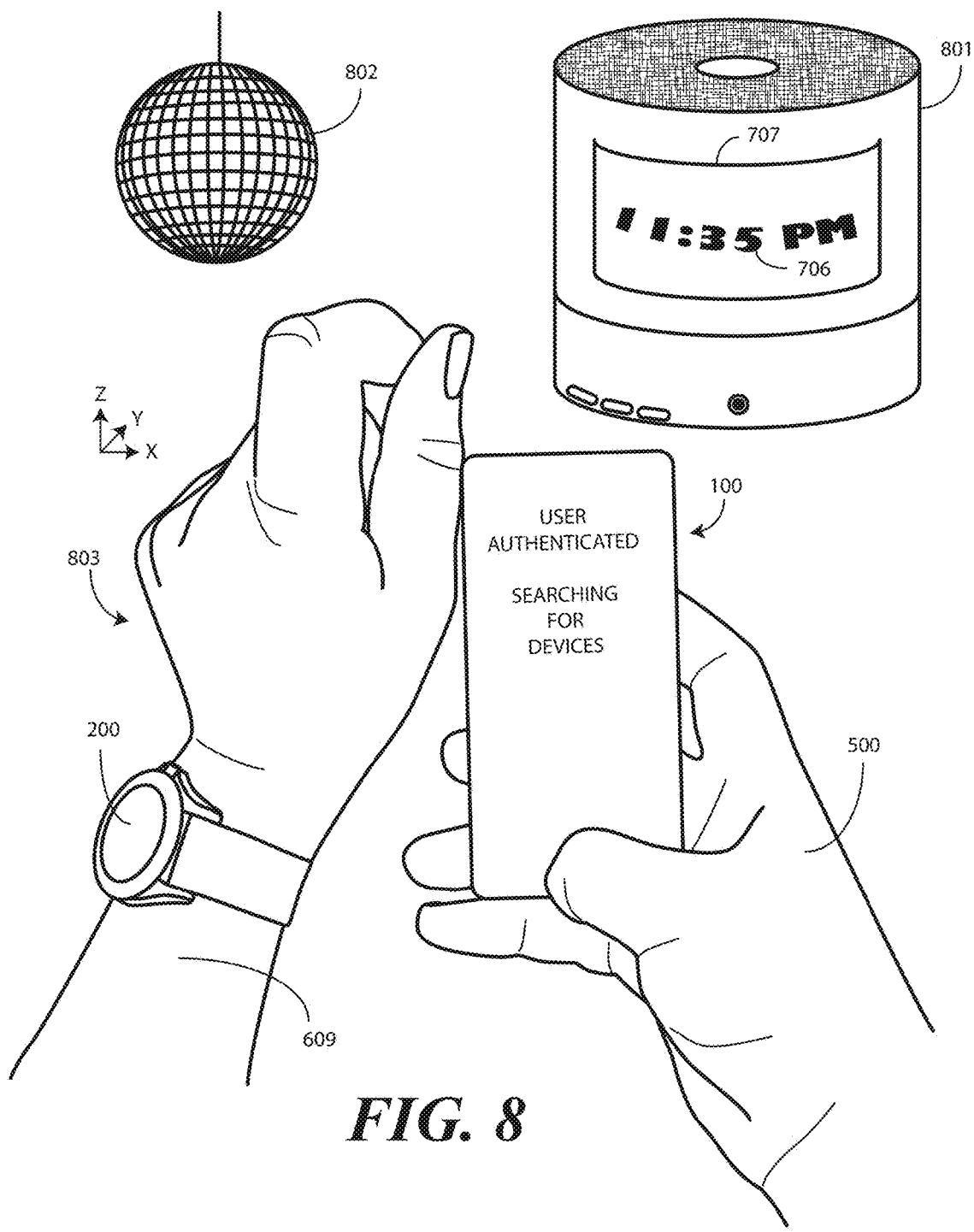
FIG. 8 illustrates one or more method steps for an explanatory system in accordance with one or more embodiments of the disclosure.

Turning to FIG. 8, the electronic device 100 has detected two companion devices 801,802 operating within the wireless communication radius (505). Here, a first companion device 801 is a music player that is paired with the electronic device 100 by a Bluetooth.sup.™ connection. The second companion device 802 is a disco strobe light that is communicating with the electronic device 100 through a router in a Wi-Fi network. These are examples of companion devices 801,802 only. Others will be readily apparent to those of ordinary skill in the art having the benefit of this disclosure.

Note that the electronic device 100 has detected two companion devices 801,802. As noted above, when this occurs, the electronic device 100 can identify a user selection in a variety of ways. A list of the companion devices 801,802 could be presented on the display from which the user 500 could make a selection by touch. Alternatively, an audible list of the companion devices 801,802 could be delivered through a loudspeaker, with the user 500 making a choice with a voice command.

In the embodiment of FIG. 8, a more intuitive option is illustrated. In this embodiment, the user 500 makes the selection by way of a predefined gesture input, which is detected by the paired device 200 the user 500 is wearing on his arm 609. As shown in FIG. 7, the user 500 has the arm 609 in a first position 803.

Figure 9:
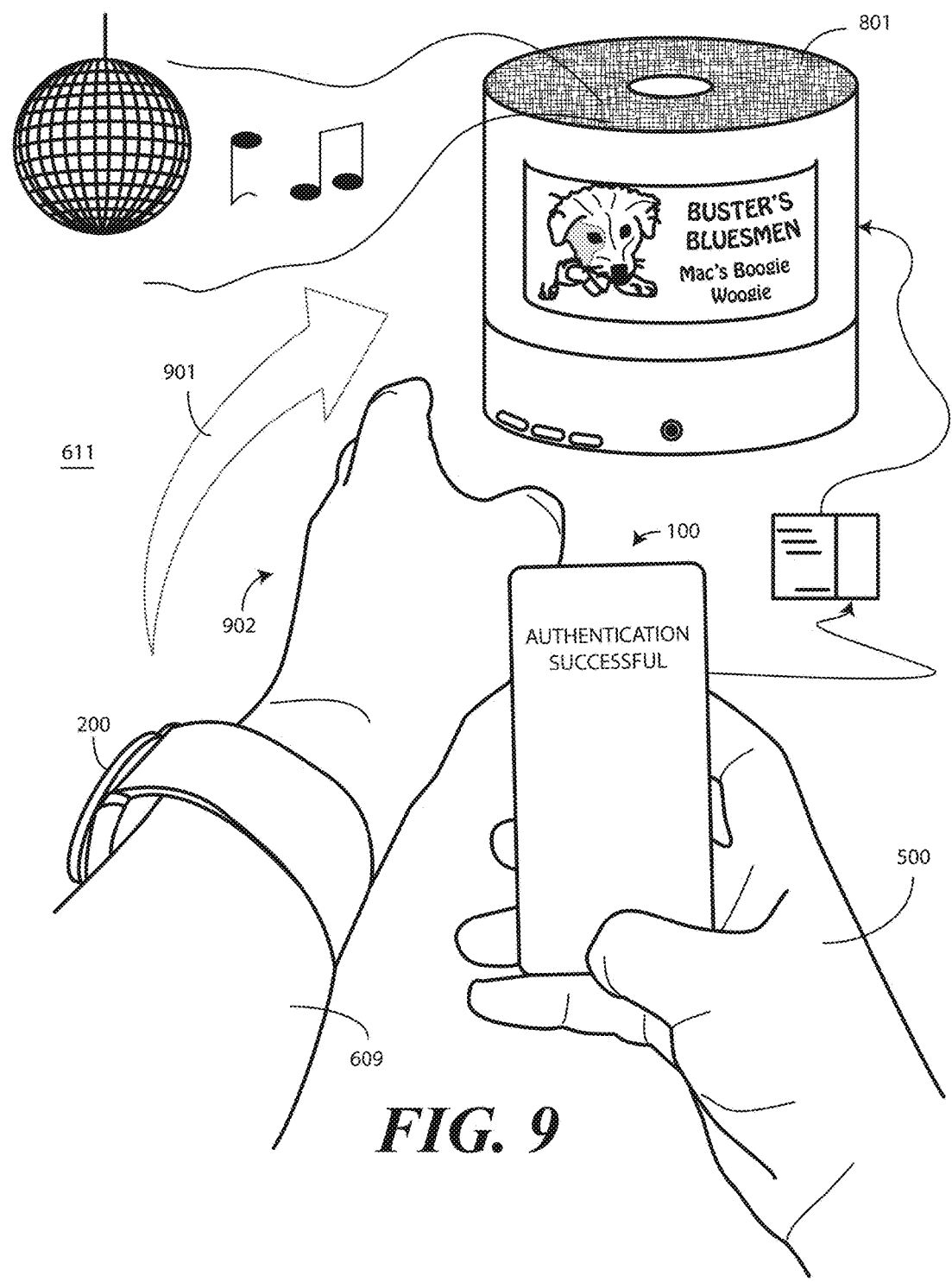
FIG. 9 illustrates one or more method steps for an explanatory system in accordance with one or more embodiments of the disclosure.

Turning to FIG. 9, the user 500 translates 901 the arm 609 in free space 611 from the first position (803), shown in FIG. 8, to a second position 902, shown in FIG. 9. This orients a major axis defined by the user's arm 609 toward companion device 801 the user 500 wishes to select. Accordingly, by making a pointing gesture toward the music player, this predefined gesture is detected by the paired device 200 and communicated to the electronic device 100.

As shown in FIG. 8, the music player is initially OFF. The user 500 can see this because a clock 806 is presented on a display of the music player. However, in this example, the user 500 wants to turn the music player ON, and thus makes the pointing gesture toward the music player.

Turning to FIG. 9, in response to the pointing gesture, the auxiliary processor (108) of the electronic device 100 selects an authentication credential 903 for the music player and causes the wireless communication circuit (109) to deliver the selected authentication credential 903 to the authentication agent operating on the music player. This causes the companion device 801 to connect to a music streaming service to start streaming music. Accordingly, the music player actuates and starts playing "Mac's Boogie Woogie" by the infamous Buster and his Bluesmen. As shown, by making a simple, intuitive predefined gesture 800, the user 600 has not only selected the music player, but has turned it on as well.

Figure 10:
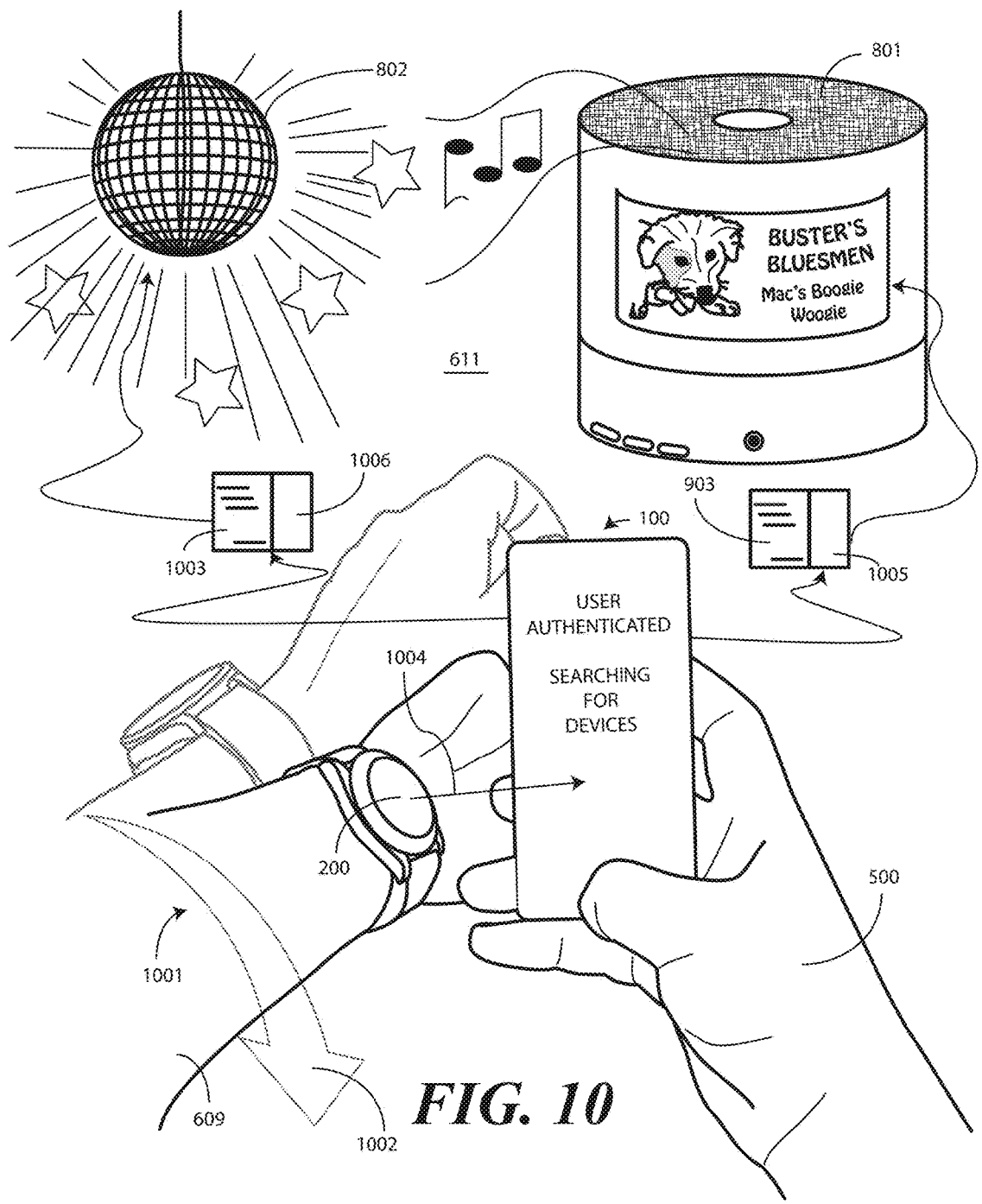
FIG. 10 illustrates one or more method steps for an explanatory system in accordance with one or more embodiments of the disclosure.

Turning now to FIG. 10, in this example the electronic device 100 has identified a plurality of companion devices. Here, a first companion device 801 is again a music player that is paired with the electronic device 100 by a Bluetooth.sup.™ connection. The second companion device 802 is the disco strobe light, which is communicating with the electronic device 100 through a router in a Wi-Fi network. Once again, it should be noted that these devices merely provide some examples of companion devices for illustration. Others will be readily apparent to those of ordinary skill in the art having the benefit of this disclosure.

In this embodiment, each companion device has an authentication agent operating therewith. The first companion device 801 receives music from a music streaming service that is interfaced through a first authentication agent. The second companion device 802 has an authentication agent that only allows trusted devices to control the disco strobe light.

As noted above in the description of FIG. 4, in some embodiments when multiple companion devices or authentication agents are identified, no selection occurs. To the contrary, authentication credentials can simply be transmitted to all companion devices. Such is the case in FIG. 10.

As shown in FIG. 10, since the electronic device 100 has identified a plurality of authentication agents operating on one or more companion devices 801,802,703 operating within the wireless communication radius of the electronic device 100, it selects an authentication credential 903,1003 for each authentication agent.

The user 500 executes a key turn simulation 1001 by rotating 1002 the paired device 200 about a major axis defined by the user's arm 609. This simulates the turning of a key once it is in a lock. The gesture sensors of the paired device 200 detect this predefined gesture and send an electronic communication 1004 identifying the predefined gesture to the electronic device 100. Said differently, the motion sensors of the paired device 200 detect the key turn simulation 1001 translating the paired device 200 in free space 611 and identify it by comparing parametric data corresponding to the key turn simulation 1001 with reference data stored in memory.

Receipt of the electronic communication 1004 identifying the key turn simulation 1001 causes the wireless communication circuit (109) to deliver all selected authentication credentials 903,1003 to all authentication agents operating on all companion devices 801,802. In this illustrative embodiment, the wireless communication circuit (109) delivers all selected authentication credentials 903,1003, with corresponding actuation tools 1005,1006, contemporaneously.

This causes several things to occur. The authentication credential 903 delivered to the first companion device 801 causes the music streaming service to start streaming music. Accordingly, the music player actuates and starts playing "Mac's Boogie Woogie" by the infamous Buster and his Bluesmen. The delivery of authentication credential 1003 to the second companion device 802 actuates the disco strobe light so that a club-type atmosphere is invoked to enhance the joy that the catalog of Buster and his Bluesmen.

Figure 11:
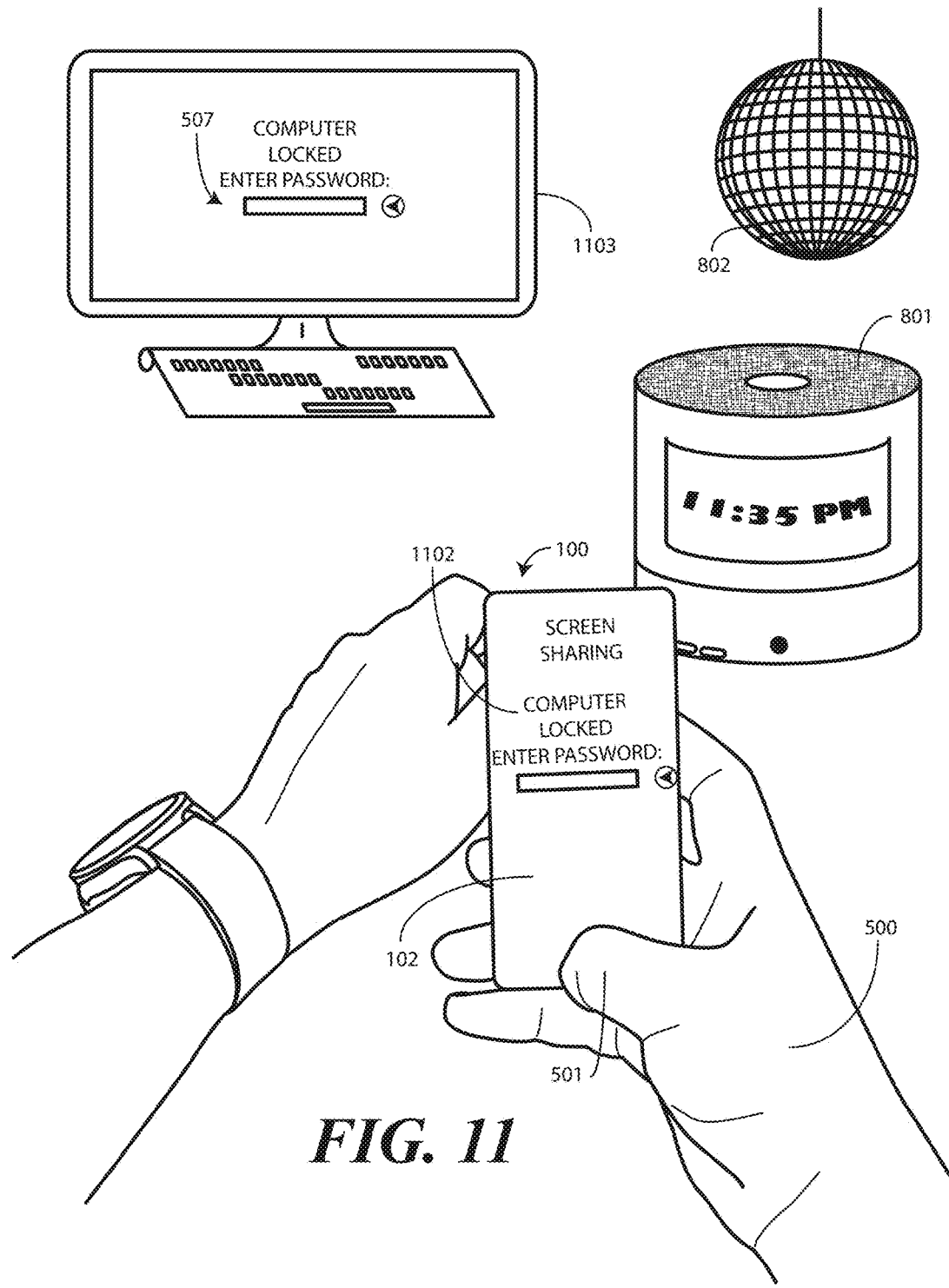
FIG. 11 illustrates one or more method steps for an explanatory system in accordance with one or more embodiments of the disclosure.

Turning now to FIG. 11, illustrated therein is another selection technique, this time using the context engine (124) of the electronic device 100. After the user 500 places their finger 501 on a fingerprint sensor (104) of the electronic device 100, and after the fingerprint sensor (104) identifies fingerprint data from the user's finger 501 to authenticate the user 500, the electronic device 100 once again identifies the first companion device 801, the second companion device 802, and a third companion device 1103 operating within the predefined communication radius. Additionally, the electronic device 100 identifies the authentication agent operating on each companion device.

In this embodiment, the context engine (124) is operating on the electronic device 100. The context engine (124) is operable to detect a contextual operating condition 1101 of the electronic device 100 and select at least one authentication agent operating on the at least one companion device from the contextual operating condition 1101.

In this example, the contextual operating condition 1101 is that of the electronic device 100 operating in a screen-sharing mode. Thus, the authentication agent 507 of the third companion device 1103 is being presented on the display 102 of the electronic device 100. Accordingly, in one embodiment the context engine (124) detects this contextual operating condition 1101.

Since the authentication agent 507 of the third companion device 1103 is being presented on the display 102 of the electronic device 100, the context engine (124) can conclude that the authentication credential for this authentication agent 507 should be delivered. Accordingly, despite there being three companion devices 801,802,1103 operating within the wireless communication radius, the context engine (124) selects the authentication agent 507 operating on the third companion device 1103.

Figure 12:
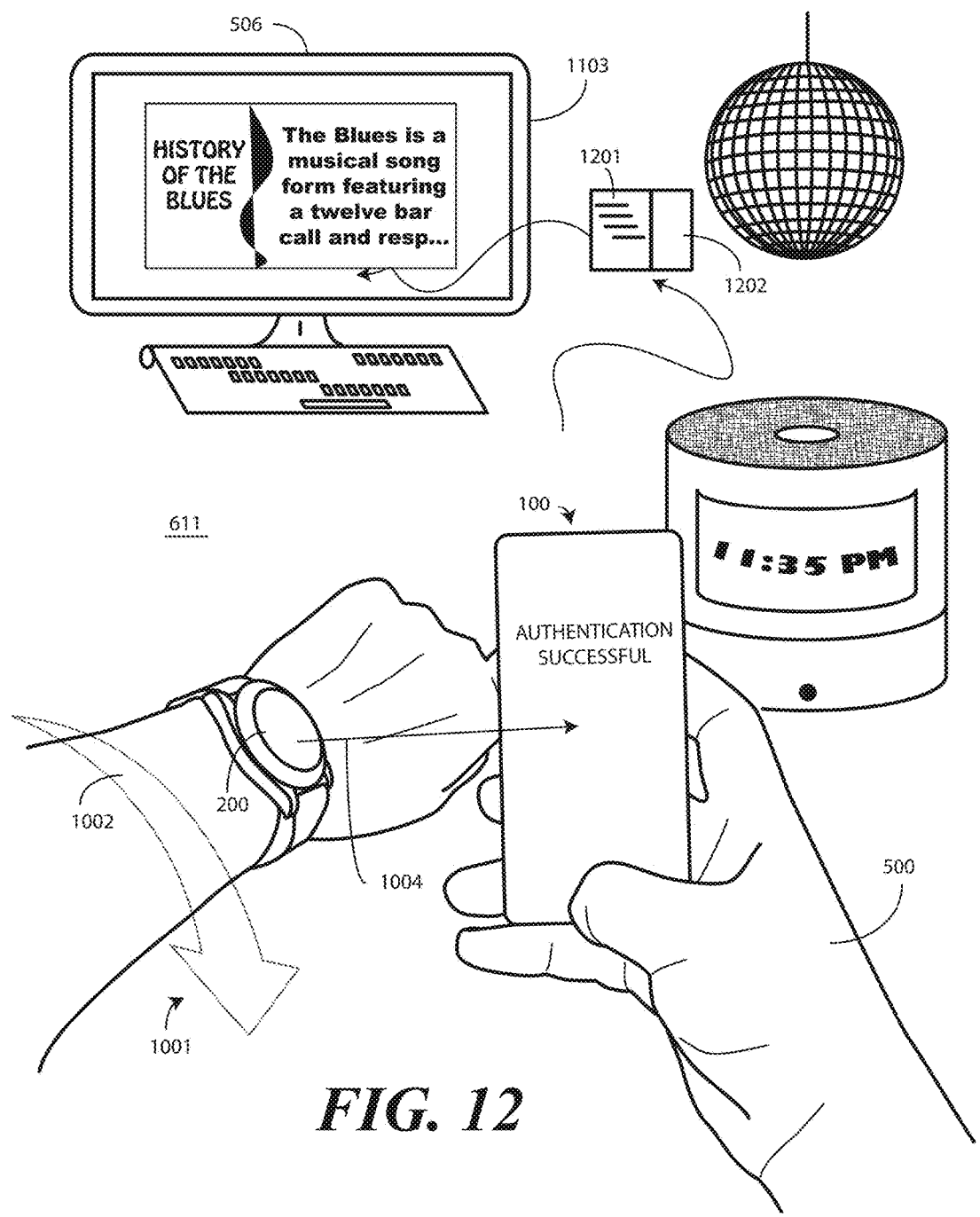
FIG. 12 illustrates one or more method steps for an explanatory system in accordance with one or more embodiments of the disclosure.

Turning now to FIG. 12, the user 500 executes a key turn simulation 1001 by rotating 1002 the paired device 200 about a major axis defined by the user's arm 609. This simulates the turning of a key once it is in a lock. The gesture sensors of the paired device 200 detect this predefined gesture and send an electronic communication 1004 identifying the predefined gesture to the electronic device 100. Said differently, the motion sensors of the paired device 200 detect the key turn simulation 1001 translating the paired device 200 in free space 611 and identify it by comparing parametric data corresponding to the key turn simulation 1001 with reference data stored in memory.

Receipt of the electronic communication 1004 identifying the key turn simulation 1001 causes the wireless communication circuit (109) of the electronic device 100 to deliver a selected authentication credential 1201 to the third companion device 1103. In this illustrative embodiment, the context engine (124) of the electronic device 100 has included two separate authentication credentials in the authentication credential 1201 communication to the computer 506. A first is for the authentication agent (507) of the computer 506, and a second is for a local library portal where education can be received. Accordingly, the authentication credential 1201 both unlocks the computer 506 and logs into the library portal. The authentication tool 1202 transmitted with the authentication credential 1201 not only accesses the computer 506 and library access portal, but also causes a brief history of the blues to be presented on the display.

Figure 13:
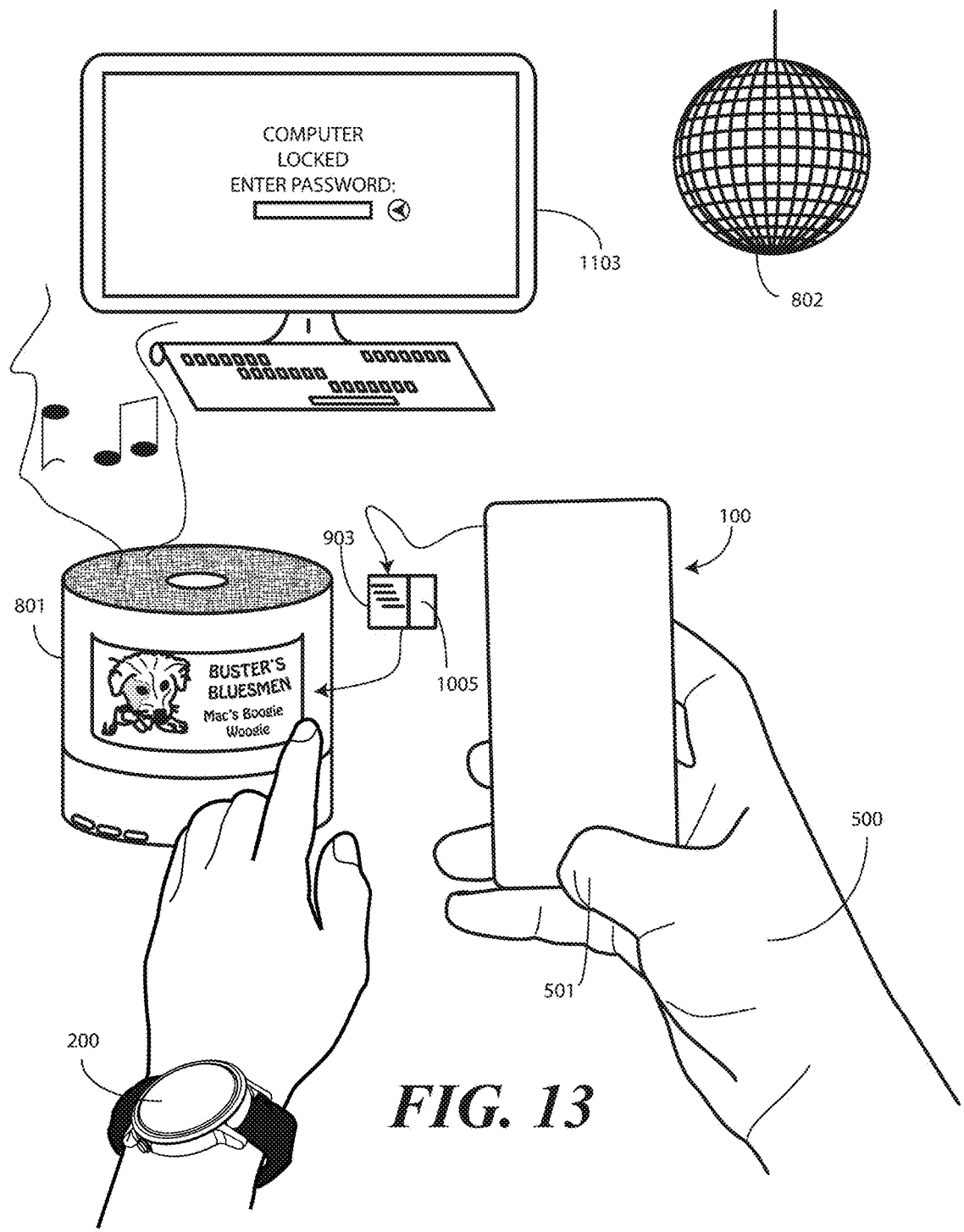
FIG. 13 illustrates one or more method steps for an explanatory system in accordance with one or more embodiments of the disclosure.
Figure 14:
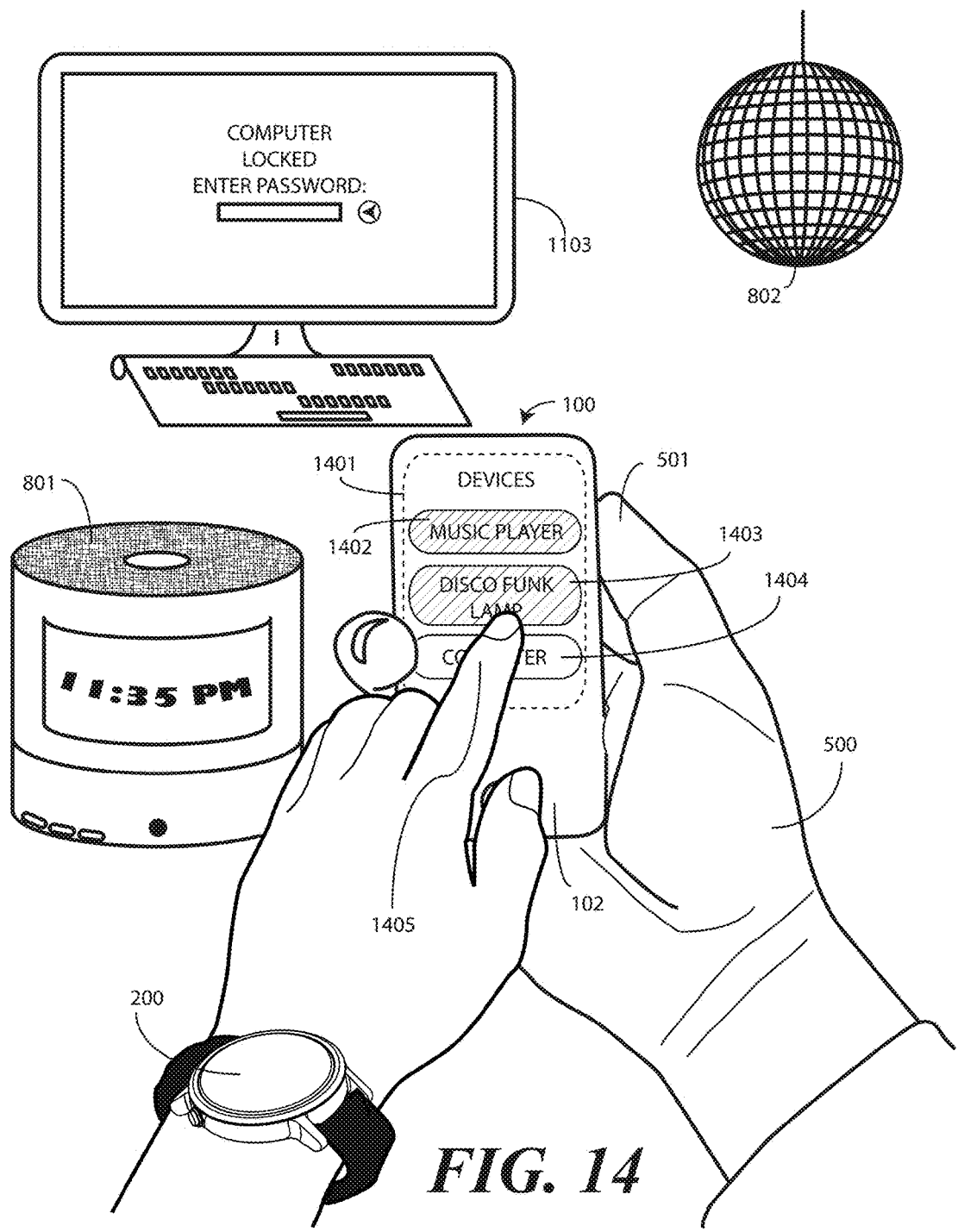
FIG. 14 illustrates one or more method steps for an explanatory system in accordance with one or more embodiments of the disclosure.
Figure 15:
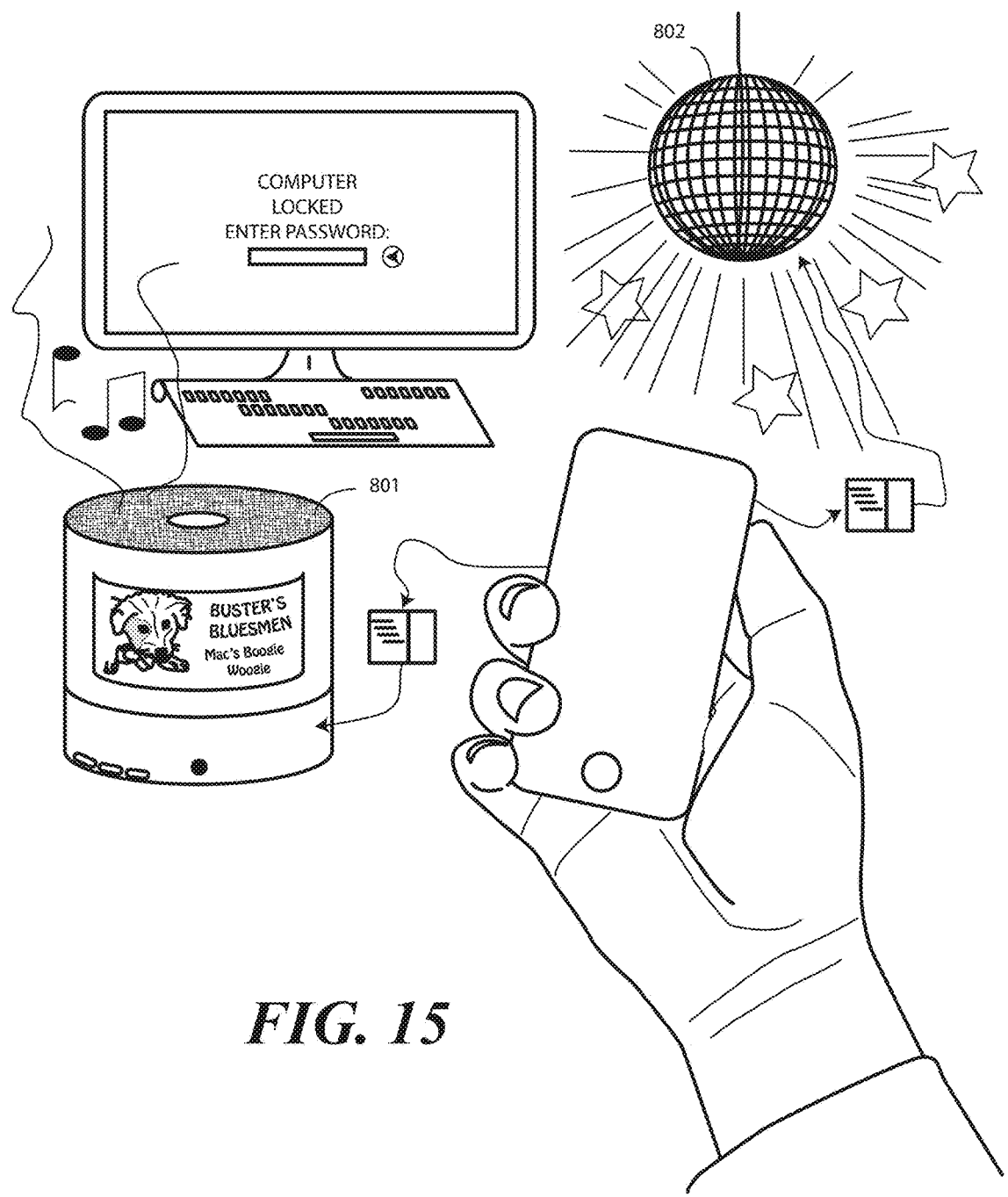
FIG. 15 illustrates one or more method steps for an explanatory system in accordance with one or more embodiments of the disclosure.

In other embodiments, the user 500 will want authentication credentials delivered to only some devices that they specifically select. Accordingly, they will prefer to select which devices receive authentication credentials. The electronic device 100 can identify a user selection in a variety of ways. A list of the companion devices could be presented on the display from which the user 500 could make a selection by touch. Alternatively, an audible list of the companion devices could be delivered through a loudspeaker, with the user 500 making a choice with a voice command. FIGS. 13-15 described below illustrate some of the various ways selections can be made.

Turning now to FIG. 13, illustrated therein is one way this can occur. After the user 500 places their finger 501 on a fingerprint sensor (104) of the electronic device 100, and after the fingerprint sensor (104) identifies fingerprint data from the user's finger 501 to authenticate the user 500, the electronic device 100 once again identifies the first companion device 801, the second companion device 802, and the third companion device 1103 operating within the predefined communication radius. Additionally, the electronic device 100 identifies the authentication agent operating on each companion device.

In this embodiment, the selection of which authentication agent is to receive the authentication credential is a function of the gesture detected by the paired device 200. As shown in FIG. 13, the user 500 makes a predefined gesture by touching the first companion device 801. The identification of this predefined gesture is delivered in the form of an electronic communication 1004 to the electronic device 100. Accordingly, despite there being three companion devices 801,802,1103 operating within the wireless communication radius, the electronic communication 1004 identifies the authentication agent operating on the first companion device 801 as a function of the predefined gesture. The electronic device 100 then selects an authentication credential 903 for the authentication agent, and optionally an actuation tool 1005 as well. The wireless communication circuit (109) of the electronic device 100 then delivers the authentication credential 903 and actuation tool 1005 to the authentication agent of the first companion device 801. Buster and his Bluesmen then start swinging.

A different technique is shown in FIG. 14. After the user 500 places their finger 501 on a fingerprint sensor 104 of an electronic device 100, and after the fingerprint sensor 104 identifies fingerprint data from the user's finger 501 to authenticate the user 500, the electronic device 100 once again identifies the first companion device 801, the second companion device 802, and the third companion device 1103 operating within the predefined communication radius. Additionally, the electronic device 100 identifies the authentication agent operating on each companion device.

Rather than sending authentication credentials to all authentication agents, in one the electronic device 100 then presents indicia 1401 identifying the authentication agents on the user interface of the electronic device 100. In this illustrative embodiment, the indicia 1401 is a textual listing of the various authentication agents 1402,1403,1404 presented on the display 102 of the electronic device 100. The user 500 is then able to make a user selection 1405 of one or more of the authentication agents 1402,1403,1404 by touching user actuation targets. In this illustration, the user 500 has selected authentication agents 1402,1403 operating both the music player and the disco strobe light because he wants to listen to music in a club-like atmosphere, but does not need the third companion device 1103.

The user 500 then makes a predetermined gesture, which is identified by the paired device 200, and communicated to the electronic device by an electronic communication. This causes the wireless communication circuit (109) operating in the electronic device 100, which is responsive to the auxiliary processor (108) or the application processor (107), to deliver an authentication credential to two authentication agents 1402,1403 operating on two companion devices 801,802. As shown in FIG. 15, this causes the first companion device 801 to play "Mac's Boogie Woogie," while the second companion device 802 illuminates so that a club-type atmosphere is invoked to enhance the joy that the catalog of Buster and his Bluesmen.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a biometric sensor identifying a biometric input received at the biometric sensor;
    one or more processors operable with the biometric sensor, the one or more processors identifying:
        at least one paired device operating within a wireless communication radius of the electronic device; and
        at least one companion device operating within the wireless communication radius; and
    a wireless communication circuit, operable with the one or more processors, the wireless communication circuit receiving an electronic communication from the at least one paired device identifying a predefined gesture input;
    the one or more processors:
        identifying at least one authentication agent operating on the at least one companion device; and
        selecting at least one authentication credential for the at least one authentication agent;
    the wireless communication circuit delivering an authentication credential to the at least one authentication agent of the at least one companion device in response to the predefined gesture input;
    the predefined gesture input identifying a companion device receiving the at least one authentication agent.

2. The electronic device of claim 1, the biometric sensor comprising a fingerprint sensor, the biometric input comprising fingerprint data.

3. The electronic device of claim 2, the one or more processors selecting the at least one authentication credential from an authentication credential store storing a plurality of authentication credentials.

4. The electronic device of claim 1, the one or more processors further:
    identifying a plurality of authentication agents operating on one or more companion devices operating within the wireless communication radius of the electronic device;
    selecting the authentication credential for each authentication agent; and
    causing the wireless communication circuit to deliver all selected authentication credentials to authentication agents operating on the one or more companion devices.

5. The electronic device of claim 1, the one or more processors further identifying a plurality of authentication agents operating on one or more companion devices operating within the wireless communication radius of the electronic device, the electronic communication comprising a selection of the at least one authentication agent from the at least one companion device.

6. The electronic device of claim 1, further comprising a context engine operable with the one or more processors, the context engine:
    detecting a contextual operating condition of the electronic device; and
    identifying the at least one authentication agent operating on the at least one companion device from the contextual operating condition.

7. The electronic device of claim 1, the one or more processors further:
    selecting at least one actuation tool operable with the at least one authentication agent for ingestion of the at least one authentication credential; and
    causing the wireless communication circuit to transmit the at least one actuation tool with the at least one authentication credential.

8. The electronic device of claim 1, wherein the at least one paired device comprises a wearable device.

9. The electronic device of claim 1, the one or more processors further delivering with the wireless communication circuit to the at least one paired device a notification indicating the authentication credential was delivered to the at least one companion device.

10. The electronic device of claim 1, the one or more processors further identifying a plurality of authentication agents operating on one or more companion devices operating within the wireless communication radius of the electronic device, the electronic communication further comprising a selection of the at least one authentication agent.

11. The electronic device of claim 1, the predefined gesture input comprising movement of the at least one paired device in free space between a first position and a second position, thereby moving the at least one paired device toward the companion device receiving the at least one authentication agent.

12. The electronic device of claim 1, the predefined gesture input comprising a translation of the at least one paired device in free space between a first position and a second position.

13. The electronic device of claim 1, the predefined gesture input comprising a key turn simulation.

14. A method, comprising:
    identifying a biometric input with a biometric sensor;
    determining, with one or more processors operable with the biometric sensor, at least one companion device and at least one paired device operating within a wireless communication radius of an electronic device;
    receiving, with a wireless communication circuit, an electronic communication from the at least one paired device identifying a predefined gesture input;
    identifying, with the one or more processors, at least one authentication agent operating on the at least one companion device and selecting at least one authentication credential for the at least one authentication agent; and delivering an authentication credential with the wireless communication circuit to the at least one companion device in response to the predefined gesture input;

the predefined gesture input identifying a companion device receiving the at least one authentication agent.

15. The method of claim 14, further comprising:

determining multiple companion devices operable within the wireless communication radius; and receiving a selection of the at least one companion device.

16. The method of claim 15, the predefined gesture identifying the selection.

17. The method of claim 14, further comprising delivering, to the at least one paired device, a notification indicating the authentication credential is delivered to the at least one companion device.

18. The method of claim 14, further comprising retrieving the authentication credential from across a network.

19. The method of claim 14, further comprising unlocking, actuating, or controlling the at least one companion device using the authentication credential.

20. The method of claim 14, further comprising determining a contextual operating condition of the electronic device, wherein the selecting is a function of the contextual operating condition.

* * * * *